US012386335B2

(12) United States Patent
Banadyha et al.

(10) Patent No.: US 12,386,335 B2
(45) Date of Patent: Aug. 12, 2025

(54) THREE-DIMENSIONAL SURFACE PATTERN GENERATION TO FACILITATE PART CREATION IN COMPUTER AIDED DESIGN AND MANUFACTURE

(71) Applicant: Autodesk, Inc., San Francisco, CA (US)

(72) Inventors: Andriy Banadyha, Uxbridge (GB); Garin Michael Gardiner, Cartersville, GA (US); Joshua David Spencer, Maineville, OH (US); Miroslav Groh, Decin (CZ); Martin Zatecka, Decin (CZ); Robert Michael Cohee, Napa, CA (US); Vaclav Prchlik, Ruzova (CZ)

(73) Assignee: Autodesk, Inc., San Francisco, CA (US)

( * ) Notice: Subject to any disclaimer, the term of this patent is extended or adjusted under 35 U.S.C. 154(b) by 361 days.

(21) Appl. No.: 17/960,031

(22) Filed: Oct. 4, 2022

(65) Prior Publication Data

US 2023/0104333 A1 Apr. 6, 2023

Related U.S. Application Data

(60) Provisional application No. 63/252,083, filed on Oct. 4, 2021.

(30) Foreign Application Priority Data

Sep. 30, 2022 (CN) .......................... 202211208856.9

(51) Int. Cl.
*B33Y 50/02* (2015.01)
*G05B 19/4097* (2006.01)
(52) U.S. Cl.
CPC ................... *G05B 19/4097* (2013.01); *G05B 2219/35012* (2013.01)

(58) Field of Classification Search
CPC ..................................................... B33Y 50/02
See application file for complete search history.

(56) References Cited

U.S. PATENT DOCUMENTS 10,065,373 B2  9/2018  Iorio et al.
10,354,442 B2  7/2019  Hill et al.
(Continued)

FOREIGN PATENT DOCUMENTS

EP          1214647 B1 *  2/2004  ............ G06F 17/50
EP          1489532       12/2004
WO   WO-2020222129 A1 * 11/2020  ............ G06F 17/50

OTHER PUBLICATIONS

Extended European Search Report in European Appln. No. 22199665.5, dated Feb. 17, 2023, 20 pages.

*Primary Examiner* — Suresh Suryawanshi
(74) *Attorney, Agent, or Firm* — Fish & Richardson P.C.

(57) ABSTRACT

Methods, systems, and apparatus, including medium-encoded computer program products, for computer aided design and manufacture of a part by three-dimensional surface pattern generation, include: receiving input identifying (i) a pattern type, (ii) a three-dimensional feature to be used to modify a three-dimensional part, and (iii) a surface of the three-dimensional part being designed; generating varied copies of the three-dimensional feature in a three-dimensional space in which the three-dimensional part is defined, wherein an aspect of the three-dimensional feature varies for at least two of the varied copies of the three-dimensional feature in accordance with a function that is applied for the pattern type, and at least a portion of a range of the function is mapped to the three-dimensional space in accordance with the surface; and rendering a visualization of the varied copies of the three-dimensional feature to a display device presenting a user interface.

39 Claims, 10 Drawing Sheets

(56) References Cited

U.S. PATENT DOCUMENTS

| | | |
|---|---|---|
| 10,467,807 B1 | 11/2019 | Strater et al. |
| 10,678,959 B2 | 6/2020 | Brochu et al. |
| 11,120,625 B2 | 9/2021 | Pförtner et al. |
| 2008/0301572 A1 | 12/2008 | Wengler |
| 2012/0109591 A1* | 5/2012 | Thompson .............. G06F 30/00 703/1 |
| 2012/0290270 A1 | 11/2012 | Delvordre et al. |
| 2013/0268244 A1 | 10/2013 | Clark et al. |
| 2016/0067928 A1 | 3/2016 | Mark et al. |
| 2019/0054731 A1* | 2/2019 | Christian ............... B33Y 50/00 |
| 2020/0298494 A1* | 9/2020 | Huang .................. B33Y 50/00 |
| 2020/0320228 A1 | 10/2020 | Lupas |
| 2021/0294300 A1 | 9/2021 | Grau et al. |

* cited by examiner

THREE-DIMENSIONAL SURFACE PATTERN GENERATION TO FACILITATE PART CREATION IN COMPUTER AIDED DESIGN AND MANUFACTURE

CROSS-REFERENCE TO RELATED APPLICATIONS

This patent application claims priority to and the benefit of U.S. Provisional Patent Application No. 63/252,083, filed on Oct. 4, 2021, which is incorporated herein by reference in its entirety.

BACKGROUND

This specification relates to surface modeling in computer graphics applications, such as computer generated animation and computer aided design of physical structures to be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to manufacture the physical structure of those objects, e.g., using Computer Numerical Control (CNC) manufacturing techniques. The CAD software has also included software tools that can be used to redesign and enhance 3D parts of the objects. The CAD software has been used in conjunction with additive manufacturing systems and techniques and subtractive manufacturing systems and techniques.

Additive manufacturing, also known as solid free form fabrication or 3D printing, refers to any manufacturing process where 3D objects are built up from raw material in a series of layers or cross-sections. Examples of additive manufacturing include Fused Filament Fabrication (FFF), Selective Laser Sintering (SLS), and Direct Metal Laser Sintering (DMLS).

Subtractive manufacturing refers to any manufacturing process where 3D objects are created from stock material (generally a "blank" or "workpiece" that is larger than the 3D object) by cutting away portions of the stock material. Such subtractive manufacturing processes typically involve the use of multiple CNC machine cutting tools in a series of operations, starting with a roughing operation, an optional semi-finishing operation, and a finishing operation.

SUMMARY

This specification relates to producing three-dimensional (3D) geometry in computer aided design of parts, which can be physical structures designed for manufacture using additive manufacturing, subtractive manufacturing and/or other manufacturing systems and techniques. Moreover, the systems and techniques described can also be implemented in animation production programs that render 3D models of the parts to an appropriate format for visual display, such as by a digital projector. Other applications are also possible.

Consumer products and industrial parts today often have complex patterns of features that human designers create so as to follow the curve of the overall design. Some of these patterns remove material allowing for sounds, lights, grip, thermal transfer, or airflow to function properly with the device. Other patterns add material allowing for grip and aesthetics of a design. Designing many of these patterns can be quite time consuming as typical patterning tools in 3D design and manufacturing tools are suited for two-dimensional (2D) patterns with limited pattern types. For this reason, users of the patterning tools often settle for a simpler (e.g., less complicated for analysis), less aesthetic pattern than they would ideally create.

The systems and techniques described can facilitate the creation of complex patterns of features, allowing users the ability to create complex patterns that add or remove material across both 2D and 3D surfaces. In some cases, the complex patterns can better align with one or more manufacturing constraints. For example, a user interface of a computer aided design program can facilitate a user to select a 3D shape to pattern, define a 3D surface to pattern across, select a pattern type (e.g., grid, triangle, hexagon, circle or radial pattern), scale the pattern across the surface, adjust the rotation of the pattern, and/or define an outer perimeter and provide an offset value to limit the extent of the pattern on a given surface. In response to a user defining such options through the user interface, the computer aided design program automatically generates a 3D pattern that can be editable using design tools in the computer aided design program. Moreover, the 3D pattern can be automatically regenerated (e.g., recomputed using parametric 3D modeling techniques) if the surface is changed by a design tool or due to changes in manufacturing strategy and/or constraints. Therefore, a change to the surface by the user automatically makes appropriate changes to the 3D pattern that is associated with that surface.

In general, one or more aspects of the subject matter described in this specification can be embodied in one or more methods (and also one or more non-transitory computer-readable mediums tangibly encoding a computer program operable to cause data processing apparatus to perform operations) including: receiving, by a computer aided design program, input identifying (i) a pattern type, (ii) a three-dimensional feature to be used to modify a three-dimensional part, and (iii) a surface of the three-dimensional part being designed; generating, by the computer aided design program, varied copies of the three-dimensional feature in a three-dimensional space in which the three-dimensional part is defined, wherein an aspect of the three-dimensional feature varies for at least two of the varied copies of the three-dimensional feature in accordance with a function that is applied for the pattern type, and at least a portion of a range of the function is mapped to the three-dimensional space in accordance with the surface; and rendering, by the computer aided design program, a visualization of the varied copies of the three-dimensional feature, which are mapped to the surface, to a display device presenting a user interface of the computer aided design program.

The method (or operations performed by the data processing apparatus in accordance with the computer program tangibly encoded in one or more non-transitory computer-readable mediums) can include: receiving input that includes change in the function; and modifying the aspect of the three-dimensional feature in accordance with the change in the function. The aspect can be sizing of the three-dimensional feature, the input that changes the function is user input to an element of the user interface that (i) changes a minimum size for the three-dimensional feature without changing a maximum size for the three-dimensional feature, or (ii) changes a maximum size for the three-dimensional feature without changing a minimum size for the three-dimensional feature. The aspect can be offset of the three-dimensional feature, the input that changes the function is user input to an element of the user interface that changes an offset between a center of the three-dimensional feature and the surface.

The method (or operations performed by the data processing apparatus in accordance with the computer program tangibly encoded in one or more non-transitory computer-readable mediums) can include: receiving input that changes the pattern type to a new pattern type; and in response to receiving the input that changes the pattern type to the new pattern type, applying the function for the new pattern type to modify the at least two of the varied copies of the three-dimensional feature. The method (or operations performed by the data processing apparatus in accordance with the computer program tangibly encoded in one or more non-transitory computer-readable mediums) can include: receiving input that changes mapping of the at least the portion of the range of the function to the three-dimensional space in accordance with the surface; and in response to receiving input that changes the mapping of the at least the portion of the range of the function, changing the varied copies of the three-dimensional feature with respect to the surface. The input that changes the mapping of the at least the portion of the range of the function changes a rotational orientation of the mapping, and the changing includes adjusting a rotation of a pattern of the varied copies of the three-dimensional feature with respect to the surface. The input that changes the mapping of the at least the portion of the range of the function changes an offset applied to a perimeter of the surface, and the changing includes repositioning the varied copies of the three-dimensional feature with respect to the surface.

The three-dimensional part is being designed for manufacturing, the surface defines a three-dimensional contour, and the varied copies of the three-dimensional feature follow the three-dimensional contour of the surface in a pre-defined manufacturing direction to be used to build the three-dimensional part. The three-dimensional part is being designed for manufacturing, the surface defines a three-dimensional contour, and the varied copies of the three-dimensional feature follow the three-dimensional contour of the surface in a local alignment of an additive manufacturing process to be used to build the three-dimensional part. The rendering includes rendering the visualization of the varied copies of the three-dimensional feature, which are mapped to the surface of the three-dimensional part, to an animation document for a digital projector. The method (or operations performed by the data processing apparatus in accordance with the computer program tangibly encoded in one or more non-transitory computer-readable mediums) can include: generating a toolpath specification for a computer-controlled manufacturing machine using the varied copies of the three-dimensional feature; and manufacturing the three-dimensional part with the varied copies of the three-dimensional feature mapped to the surface of the three-dimensional part using the toolpath specification generated for the computer-controlled manufacturing machine. The generating is performed in accordance with parametric 3D modelling techniques, and the method (or operations performed by the data processing apparatus in accordance with the computer program tangibly encoded in one or more non-transitory computer-readable mediums) can include: receiving input that includes change in the surface of the three-dimensional part being designed; and regenerating, in accordance with the parametric 3D modelling techniques, varied copies of the three-dimensional feature in accordance with the change in the surface.

One or more aspects of the subject matter described in this specification can also be embodied in one or more systems including: a non-transitory storage medium having instructions of a computer aided design program stored thereon; and one or more data processing apparatus configured to run the instructions of the computer aided design program to perform operations specified by the instructions of the computer aided design program; wherein the operations include: receiving input identifying (i) a pattern type, (ii) a three-dimensional feature to be used to modify a three-dimensional part, and (iii) a surface of the three-dimensional part being designed; generating varied copies of the three-dimensional feature in a three-dimensional space in which the three-dimensional part is defined, wherein an aspect of the three-dimensional feature varies for at least two of the varied copies of the three-dimensional feature in accordance with a function that is applied for the pattern type, and at least a portion of a range of the function is mapped to the three-dimensional space in accordance with the surface; and rendering a visualization of the varied copies of the three-dimensional feature, which are mapped to the surface, to a display device presenting a user interface of the computer aided design program.

Particular embodiments of the subject matter described in this specification can be implemented to realize one or more of the following advantages.

The systems and techniques described improves the technical field of computer aided design, and provides the technical effect of substantially reducing product design time using computer-based tools by assisting the user in performing the technical task of designing new parts. A user interface can facilitate the user to select a model surface and a 3D feature and populate the 3D feature with a pattern that can be readily adjusted to get the desired outcome for the part. Users need not settle for a simple 2D pattern (e.g., by selecting two axes, a circular pattern, patterning along a flat surface, patterning that does not conform with a curved surface, or patterning with features of the same size). Rather, the user can rapidly create more complex patterns that can be programmatically tied to a selected surface of the part being designed. The created pattern of features can conform to and follow the contour of a 3D surface and/or be varied in size, offset (e.g., penetration or depth into a part), orientation, rotation, and a combination of various aspects of the feature across the surface, and this can be achieved automatically in response to a few inputs to a user interface. For example, a change to the sizes of the pattern of features can be produced automatically based on inputs of values through an interface element of the user interface. The systems and techniques described can avoid the need to manually create the complex patterns in multiple steps for a specific surface or model, and can avoid requiring a programmer to write a customized computer program (e.g., a script) to create each new pattern. Moreover, the pattern created through the user interface can conform to and/or follow the surface and be fully parametric, reproducible, or both. The patterns created through the CAD programs can provide aesthetic (e.g., a detailed and/nuanced appearance of an animated character) and/or functional (e.g., a good grip, thermal transfer, fluid flow such as airflow, sound and/or light pathways, etc.) aspects that can be readily and rapidly added to a design of a part to be manufactured or an animation to be displayed.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
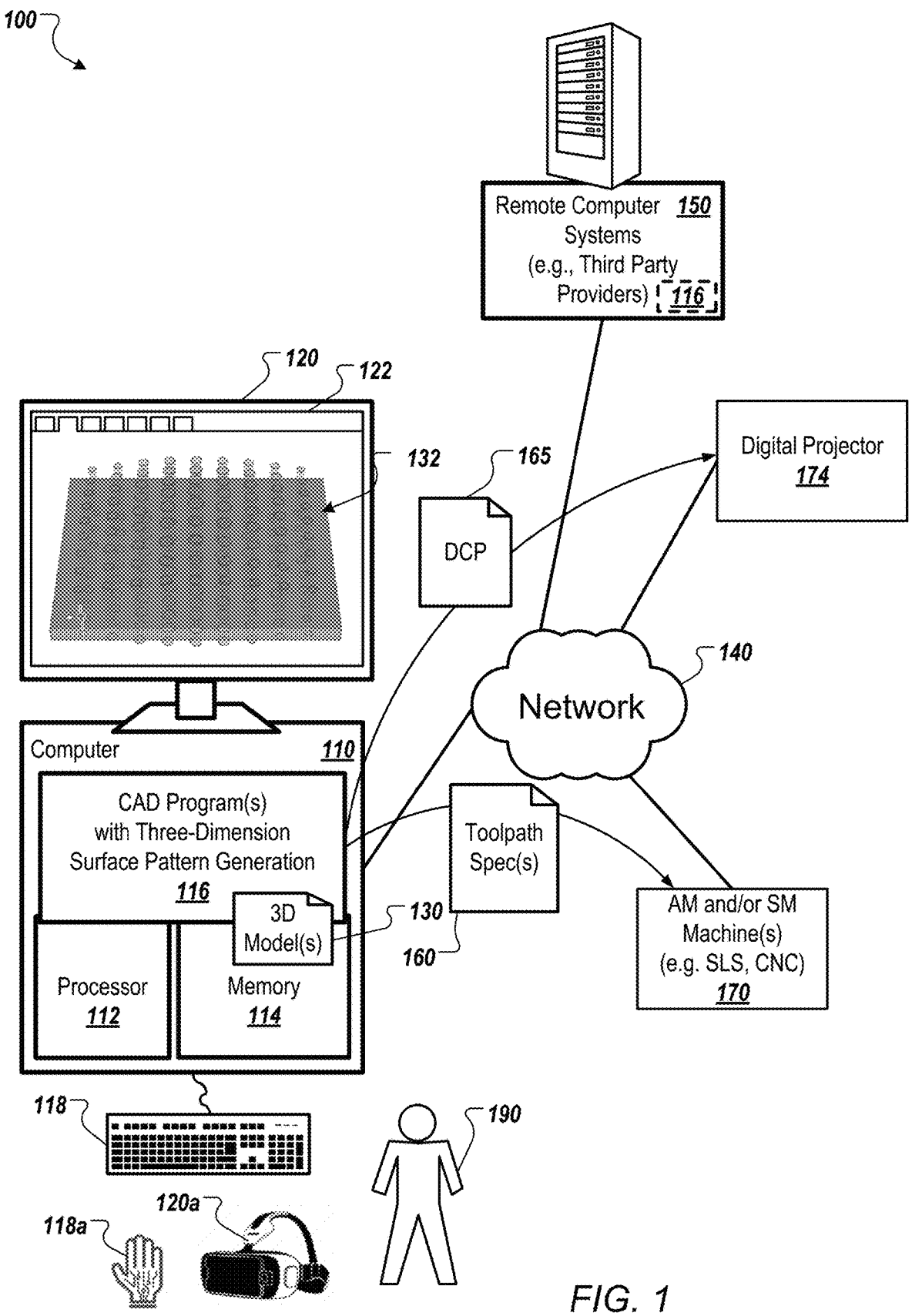
FIG. 1 shows an example of a system usable to design and manufacture physical structures and/or generate computer animation using three-dimensional surface patterns.

FIG. 1 shows an example of a system 100 usable to design and manufacture physical structures and/or generate computer animation using three-dimensional surface patterns. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions, including generating patterns of features on a surface of a 3D part.

As used herein, CAD refers to any suitable program used to design physical structures that meet specified design requirements, regardless of whether or not the program is capable of interfacing with and/or controlling specific manufacturing equipment. Thus, CAD program(s) 116 can include Computer Aided Industrial Design (CAID) program(s), Computer Aided Engineering (CAE) program(s), Computer Aided Manufacturing (CAM) program(s), etc. The CAD program(s) 116 can run locally on computer 110, remotely on a computer of one or more remote computer systems 150 (e.g., one or more third party providers' one or more server systems accessible by the computer 110 via the network 140) or both locally and remotely. Thus, the CAD program(s) 116 can be two or more programs that operate cooperatively on two or more separate computer processors in that a program operating locally at computer 110 can offload processing operations "to the cloud" by having one or more programs on one or more remote computer systems 150 perform the offloaded processing operations.

The CAD program(s) 116 present a user interface (UI) 122 on a display device 120 of the computer 110, which can be operated using one or more input/output devices 118 of the computer 110 (e.g., keyboard and mouse). Note that while shown as separate devices in FIG. 1, the display device 120 and/or input/output devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, 120 can include a VR/AR input glove 118a and/or a VR/AR headset 120a.

As noted above, the CAD program(s) 116 implement 3D modeling functions, which means a 3D model 132 can be built using the CAD program(s) 116. The CAD program(s) 116 can generate a pattern of a 3D feature on the surface of a 3D part to facilitate building the 3D model 132 of the 3D part. The CAD program(s) 116 can substantially reduce 3D surface pattern design (and redesign) time using computer-based tools by assisting a user, e.g., an engineer or a designer, in performing the technical task of generating complex patterns that are programmatically tied to a selected surface of a part being designed.

The CAD program(s) 116 can provide a user interface (UI) 122 that allows the user to select a model surface and a 3D feature and populate the 3D feature with a pattern that can be readily adjusted to get the desired output for the part. The CAD program(s) 116 can receive input identifying (i) a pattern type, (ii) a 3D feature to be used to modify a 3D part, and (iii) a surface of the 3D part being designed. Examples of a pattern type include grid, triangle, hexagon, circle, or radial. Examples of a 3D feature include a cylinder object, a sphere object, a cube object, a cone object, or a pyramid object. For example, the 3D model 132 is a visualization of copies of a cylinder object, which are mapped to a flat surface of a 3D rectangular body, to be used to modify (e.g., add to or subtract from) the 3D rectangular body. The cylinder object has been copied across the surface of the 3D rectangular body in a grid pattern type.

The CAD program(s) 116 can generate copies of the 3D feature in a 3D space in which the 3D part is defined. An aspect (e.g., size, orientation, rotation, offset such as penetration into the part, or a combination of these) of the 3D feature can vary for at least two (and optionally for all) of the copies of the 3D feature in accordance with a function that is applied to the pattern type. For example, in the 3D model 132, the cylinder object is larger in the center and tapers off in size (i.e., getting smaller) the closer a copied feature is to the perimeter of the surface of the 3D rectangular body The function can be a continuous, discretized, or piecewise continuous function. At least a portion of a range of the function is mapped to the 3D space in accordance with the surface, such that the copies of the 3D feature conform to and follow a contour of the surface.

In some implementations, the offset aspect of the 3D feature can vary for at least two (and optionally for all) of the copies of the 3D feature in accordance with the function that is applied to the pattern type. The offset can be defined as the center of the 3D feature to the surface of the 3D part. Parts for industrial machines or consumer products can include filters or holes, e.g., for agriculture or food processing, where a user may want to vary the offset, e.g., depth of a pattern, while ensuring that the copies of the 3D feature conform with the surface of a 3D part. For example, when cutting a hole using a 3D feature, the 3D feature may make it all the way through the 3D part, or may not go all the way through. Similarly, when adding a 3D feature, a user may want to control the location of the 3D feature relative to the surface. The CAD program(s) 116 can provide a UI element for configuring the offset of the 3D feature and the offset can be uniform or can vary for the copies of the 3D feature. More details of changing the offset aspect of the 3D feature are described below in connection with FIGS. 9A-9F.

The CAD program(s) 116 can render a visualization of the varied copies of the 3D feature, which are mapped to the surface, to the display device 120 presenting the UI 122 of the CAD program(s) 116. For example, a user 190 can interact with the UI 122 of the CAD program(s) 116, including generating a rendering of the varied copies of the cylinder object, which are mapped to the surface of the 3D rectangular body. The user 190 can build and modify the 3D model 132 through the UI 122, and the 3D model 132 can be stored in 3D model document(s) 130. In the example of FIG. 1, the 3D model 132 is of a specific surface pattern of a cylinder object on the surface of a 3D rectangular part, but this is merely one of many possible 3D models that can be designed using the systems and techniques described herein. Many different types of objects can be selected as a 3D feature to be used to modify different types of surfaces (e.g., a flat surface or a curved surface) of a 3D part.

As described in further detail below, in some implementations, the CAD program(s) 116 can receive input that changes the function that is applied to the pattern type, and can modify the aspect (e.g., size, orientation, rotation, offset, or a combination of these) of the 3D feature in accordance with the change in the function. In some implementations, the CAD program(s) 116 can receive input that changes the pattern type to a new pattern type, changes the rotational orientation of the mapping of the function to the 3D space in accordance with the surface, or changes an offset applied to a perimeter of the surface, or a combination of these. In response, the CAD program(s) 116 can change the copies of the feature to generate an updated 3D surface pattern.

For example, the UI 122 of the CAD program(s) 116 can facilitate a user to scale the pattern across the surface, adjust the rotation of the pattern, and/or define an outer perimeter and provide an offset value to limit the extent of the pattern on a given surface. In response to a user defining such options through the UI 122, the CAD program(s) 116 can automatically generate a 3D pattern that can be editable using design tools in the CAD program(s) 116.

While designing parts, users of the CAD program(s) 116 need not settle for simple two-dimensional (2D) patterns. The CAD program(s) 116 can facilitate the users to rapidly create more complex patterns that are programmatically tied to a selected surface of the part being designed. The created pattern of features can conform to and/or follow the contour of a 3D surface and can be varied in size across the surface. This surface pattern generation can be achieved automatically in response to a few inputs to the user interface 122, avoiding the need to manually create the complex patterns in multiple steps for a specific surface or model.

In some implementations, the CAD program(s) 116 can implement manufacturing control functions. Once the user 190 is satisfied with the 3D model 132, the 3D model 132 can be stored as the 3D model document(s) 130 and/or used to generate another representation of the model (e.g., a .STL file for additive manufacturing). This can be done upon request by the user 190, or in light of the user's request for another action, such as sending the 3D model 132 to additive manufacturing (AM) machine(s) and/or subtractive manufacturing (SM) machine(s) 170, molding, or other manufacturing machinery, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the CAD program(s) 116 can provide a document 160 (having toolpath specifications of an appropriate format) to an AM and/or SM machine 170 to produce a physical structure corresponding to at least a portion of the 3D model 132. An AM machine 170 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Deposition Modeling (FDM), which can include metals deposition AM). In some cases, the AM machine 170 builds the physical structure directly, and in some cases, the AM machine 170 builds a mold for use in casting or forging the physical structure. Thus, manufacturing of the part can involve using molding techniques, such as injection molding, overmolding, compression molding, compression-injection molding and insert molding manufacturing processes. In addition, the user 190 can save or transmit the 3D model 132 for later use. For example, the CAD program(s) 116 can store the document(s) 130 that includes the 3D model 132.

An SM machine 170 can be a Computer Numerical Control (CNC) milling machine, such as a multi-axis, multi-tool milling machine used in the manufacturing process. For example, the CAD program(s) 116 can generate CNC instructions for a machine tool system 170 that includes multiple tools (e.g., solid carbide round tools of different sizes and shapes, and insert tools of different sizes that receive metal inserts to create different cutting surfaces) useable for various machining operations. Thus, in some implementations, the CAD program(s) 116 can provide a corresponding document 160 (having toolpath specifications of an appropriate format, e.g., a CNC numerical control (NC) program) to the SM machine 170 for use in manufacturing the physical structure using various cutting tools, etc.

In some implementations, the CAD program(s) 116 can provide instructions to build a workpiece in a first stage of manufacturing, e.g., using direct AM and/or using forging and/or casting methods, and the CAD program(s) 116 also provide instructions to machine the workpiece, e.g., roughing and/or finishing operations, in a second stage of manufacturing, e.g., in a 3-axis CNC milling system, in order to form the completed structure. In general, various different manufacturing systems and techniques can be employed, either alone or in combination, to produce a final structure, and the CAD program(s) 116 can include suitable algorithms to generate toolpath specifications 160 for one or more of these various systems to manufacture a part that has been designed using the systems and techniques described in this application.

In some implementations, the CAD program(s) 116 can provide the user with UI tools that make it easier to make sure the part with the pattern is manufacturable. When creating a pattern by making varied copies of a 3D feature on a curved surface, the CAD program(s) 116 can provide the user with UI tools to determine an orientation of the copies of the 3D feature based on the manufacturing process. The copies of the 3D feature can go straight down or can orient to a normal vector on the curved surface, i.e., the 3D feature can orient to the angle of the surface at a given point. For example, a user can determine to let the 3D features go straight down to the surface when 2-axis milling is used for manufacturing the part. As another example, the user can determine to let the 3D feature orient to a normal vector at a point on the curved surface when 3D printing or injection molding is used for manufacturing the part.

In some implementations, no physical manufacturing is involved. The systems and techniques described herein are applicable to any suitable surface modeling software. An animation designer can use the CAD program(s) 116 to accurately and efficiently design a desired pattern that conforms to a 3D surface. Thus, in some implementations, the CAD program(s) 116 can be animation production programs that render the 3D model 132 to a document 165 of an appropriate format for visual display, such as by a digital projector 174 (e.g., a digital cinema package (DCP) 165 for movie distribution) or other high resolution display device. Other applications are also possible.

In some implementations, the CAD program(s) 116 can generate 3D patterns that are used in computer simulation and digital prototyping. For example, the CAD program(s) 116 can automatically and efficiently generate a model of a 3D pattern of a part used for ventilation, and computer simulation program(s) can use the model of the 3D pattern in flow animation, flow analysis (e.g., computational fluid dynamics analysis), thermal analysis, or a combination of these, to determine how the flow could change based on how the holes in the 3D pattern are designed and arranged. Thus, the computer simulation and/or the digital prototyping program(s) can provide fast and accurate results through better animation, visualization, or analysis of the 3D pattern created using the CAD program(s) 116.

Figure 2:
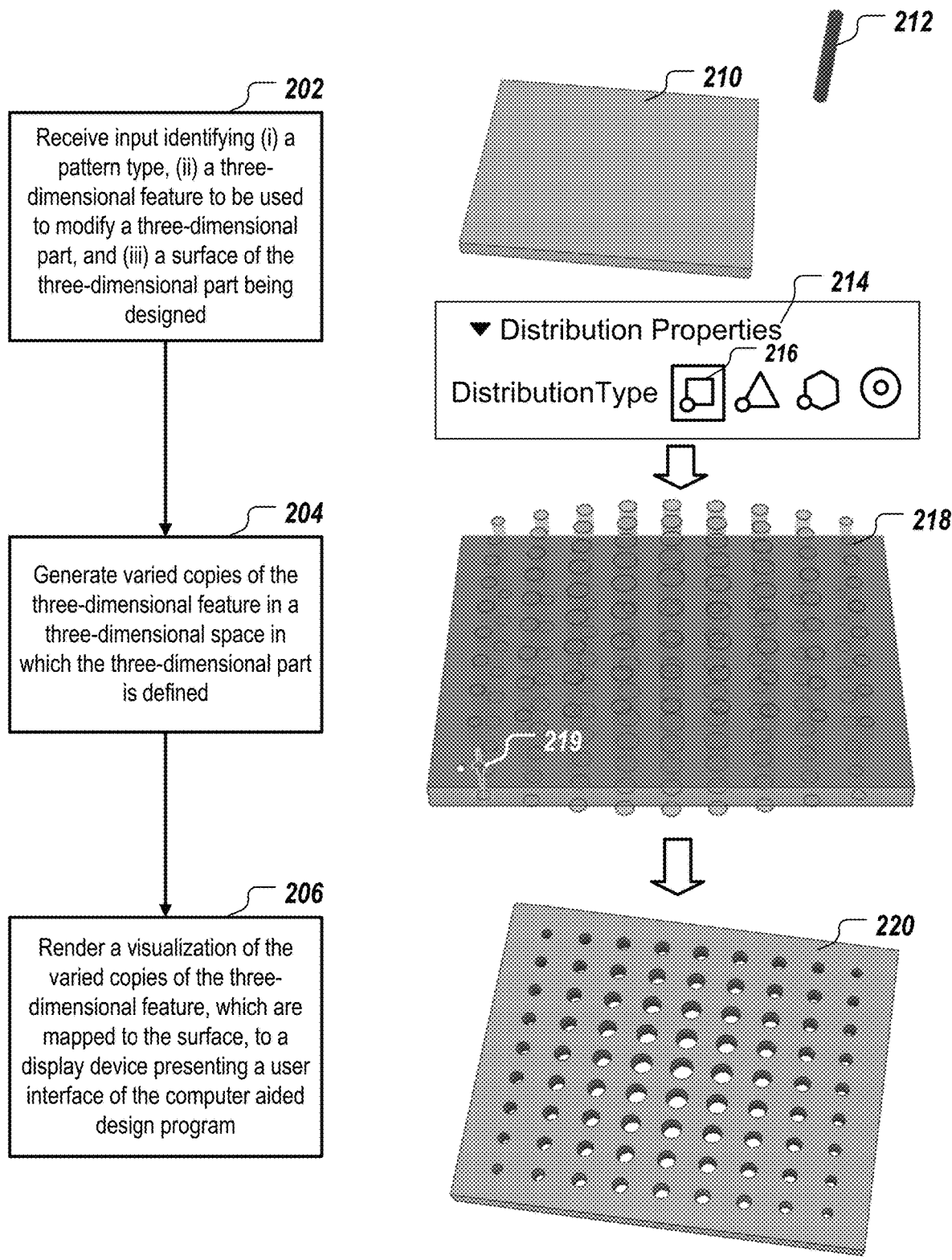
FIG. 2 is a flowchart showing an example of a process to generate a three-dimensional surface pattern.

FIG. 2 is a flowchart showing an example of a process to generate a three-dimensional surface pattern. Input identifying (i) a pattern type, (ii) a three-dimensional feature to be used to modify a three-dimensional part, and (iii) a surface of the three-dimensional part being designed is received 202, e.g., by the CAD program(s) 116. For example, a pattern type can be grid, triangle, hexagon, circle or radial pattern. The part being designed can be a part being designed for manufacturing or animation.

For example, the CAD program(s) 116 can receive input identifying a 3D feature, e.g., a cylinder object 212, to be used to modify a three-dimensional part, e.g., a 3D rectangular body 210. For example, the cylinder object 212 can be used to remove different portions of the rectangular body 210. The CAD program(s) 116 can receive input identifying a surface of the 3D part being designed, e.g., the flat top surface of the 3D rectangular body 210. The CAD program(s) 116 can receive input identifying a pattern type, e.g., a grid pattern type. For example, the CAD program(s) 116 can include a user interface (UI) element 214 displayed on a display device 120 of the CAD program(s) 116 and the UI element 214 can list various pattern types, e.g., grid, triangle, hexagon, circle. The CAD program(s) 116 can receive input identifying a pattern type when a user selects a pattern type, e.g., a grid pattern type 216, through the UI element 214.

Varied copies of the three-dimensional feature in a three-dimensional space in which the three-dimensional part is defined is generated 204, e.g., by the CAD program(s) 116. An aspect of the three-dimensional feature can vary for at least two of the varied copies of the three-dimensional feature in accordance with a function that is applied to the pattern type. For example, an aspect of the 3D feature can include size, orientation, or both. In some implementations, the aspect of the 3D feature can vary for all of the varied copies of the 3D feature in accordance with a function that is applied for the pattern type. The function can be a continuous, discretized, or piecewise continuous function. The function can be defined based on the surface in a surface domain, e.g., using UV mapping with Cartesian or radial coordinates to place the 3D features on the curved surface. The function can be a linear function or a non-linear function. At least a portion of a range of the function can be mapped to the three-dimensional space in accordance with the surface. Therefore, the varied copies of the 3D feature can follow any contour of the surface.

For example, the CAD program(s) 116 can generate varied copies of the cylinder object 212 in the 3D space in which the 3D rectangular body 210 is defined. Using the grid pattern type, the CAD program(s) 116 can place copies of the cylinder object 212 on a grid across the top surface of the 3D rectangular body 210. A rendering 218 of the varied copies of the cylinder object 212 is shown in FIG. 2. The size of the cylinder object 212 can vary for at least two (or all) of the varied copies of the 3D feature. In the rending 218, the size of the cylinder object 212 varies for all of the copies of the 3D cylinder object in accordance with a function that makes the size of the cylinder object 212 larger at the center and smaller near the edge of the surface. The function can be preprogramed into the CAD program(s) 116, and the user is provided one or more control inputs to the function by the UI of the CAD program(s) 116, such as described in further detail below. In some implementations, more than one function is made available and/or the CAD program(s) 116 allow the user to define the function(s). The function is applied for the grid pattern type 216 selected in the UI element 214. At least a range of the function can be mapped to the 3D space in accordance with the top surface of the 3D rectangular body 210, and the varied copies of the cylinder object can follow the contour of the flat surface of the 3D rectangular body 210.

In some implementations, the CAD program(s) 116 can determine the property of the surface. Based on the property of the surface, the CAD program(s) 116 can determine what kind of function to apply. For example, the CAD program(s) 116 can determine that the surface 210 is a flat 2D surface. Based on determining that the surface 210 is flat, the CAD program(s) 116 can determine to apply a linear function, e.g., a linear function of radial distance from a center of the surface 210, as shown.

Figure 3:
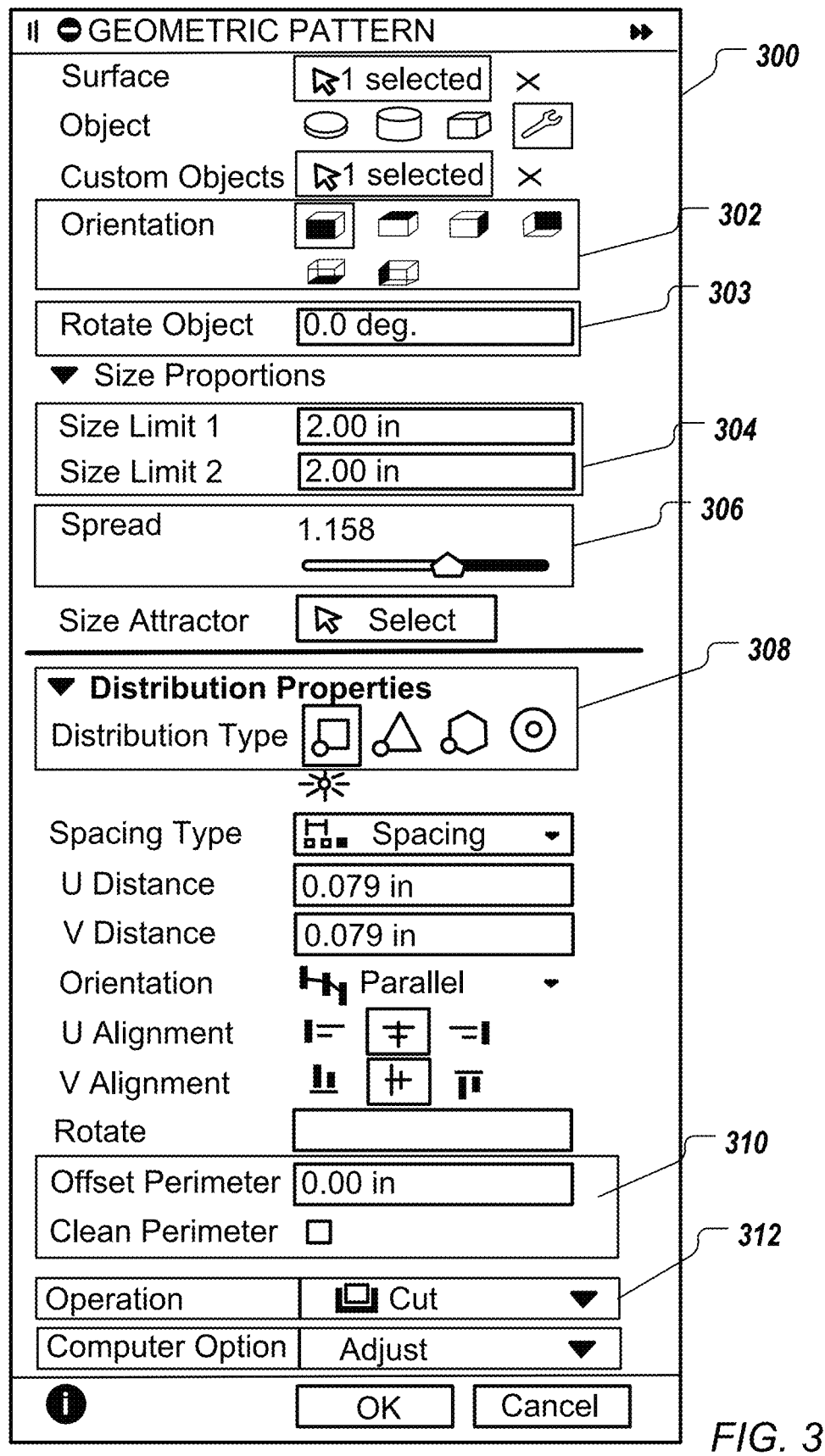
FIG. 3 is an example of a user interface element for three-dimensional surface pattern generation.

A visualization of the varied copies of the three-dimensional feature is rendered 206, e.g., by the CAD program(s) 116. For example, the CAD program(s) 116 can show a rendering 220 of the varied copies of the cylinder object 212, which have been used to remove material from the 3D rectangular body 210 to create through holes, on the UI 122 of the display device 120. Thus, the CAD program(s) 116 can show a visualization of the 3D part that has been modified by the varied copies of the 3D feature. Examples of the modification include "join" (e.g., adding the copies of the 3D feature to the 3D part), "cut" (e.g., removing the copies of the 3D feature from the 3D part), "intersect" (e.g., generating an intersection of the copies of the 3D feature and the 3D part), "new bodies" (e.g., the copied feature becomes new 3D bodies in the design), and other possible modifications. FIG. 3 is an example of a user interface (UI) element 300 for three-dimensional surface pattern generation. The "Operation" UI element 312 can accept user input that identifies a modification operation, such as "Cut", "intersect", "join", "new bodies".

In some implementations, a user can select an OK button in the UI 122 (e.g., the UI element 300 in FIG. 3), and the CAD program(s) 116 can perform the modification, e.g., removing the copied and varied features from the solid model. For example, the CAD program(s) 116 can remove material from the part being designed in accordance with the designed pattern. For example, the rendering 220 is a visualization of the 3D rectangular body 210 that has been cut by the varied copies of the cylinder object 212.

Figure 4A:
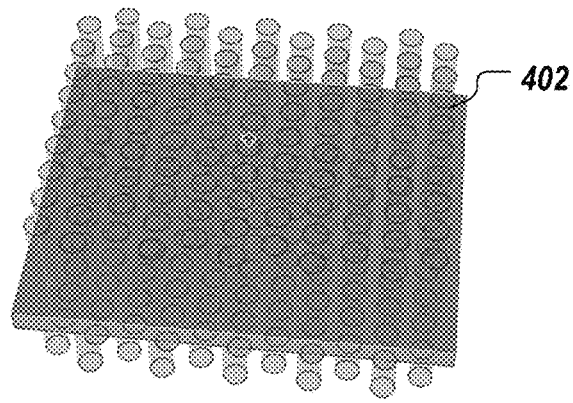
FIGS. 4A-4F are graphical renderings showing an example of using a cylinder object to generate a pattern on a flat surface of a part.

FIGS. 4A-4F are graphical renderings showing an example of using the cylinder object 212 to generate a pattern on a flat surface of a part, e.g., the top flat surface of the 3D rectangular body 210. In response to receiving input identifying the grid pattern type 216 (e.g., a triangle pattern type), the cylinder object 212, and the flat top surface of the 3D rectangular body 210, the CAD program(s) 116 can automatically produce an initial pattern and can display a rendering 402 of the initial pattern with a triangle pattern type, as shown in FIG. 4A, to the display device 120 as a visualization of copies of the 3D feature, e.g., the cylinder object 212, mapped to the surface of the part. The copies of the 3D feature in the initial pattern can have the same aspect of the 3D pattern, e.g., the same size for the cylinder object 212.

Figure 4B:
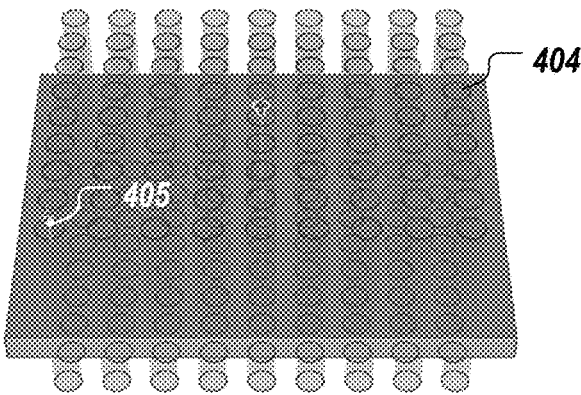

Because the pattern is already mapped to the surface of the solid model, changes made to the selected surface of that solid model using user interface controls of a computer aided design program can automatically result in corresponding changes being made to the visualized pattern. For example, the UI 122 allows a user to rotate the solid model around one or more axes to change the viewing perspective of the solid model. FIG. 4B shows a different viewing perspective of the copies of the cylinder object mapped to the surface of the 3D rectangular body.

In some implementations, the display device 120 of the CAD program(s) 116 can present the UI 122 that allows a user to modify the pattern shown on the display device 120. This UI 122 can include various UI elements, such as a geometric pattern properties dialog box, which allows values to be entered with an input device, e.g., a keyboard or a mouse.

FIG. 3 is an example of a user interface (UI) element 300 for three-dimensional surface pattern generation. The UI element 300 (e.g., also referred to as a "properties dialog box" 300) can allow a user to enter or change one or more properties of the 3D surface pattern that is being designed. The UI element 300 can include a "Surface" element that can receive input identifying a surface of a 3D part being designed. The user interface element 300 can include an "Object" element (e.g., a sphere, a cylinder, a box, etc.) and/or a "Custom Object" element defined by a user that can receive input identifying a 3D feature to be used to modify the 3D part. As discussed above in connection with FIG. 2, the user interface element 300 can include a "Distribution type" element 308 that can receive input identifying a pattern type. The user interface element 300 can include one or more elements that can receive input identifying geometric pattern properties, such as "Orientation" 302, "Rotate Object" 303, "Size Properties" (e.g., "Size Limit 1" and "Size Limit 2" 304, "Spread" 306, and "Size Attractor"), "Spacing Type", "U distance", "V distance", "U alignment", "V alignment", "Perimeter Properties" (e.g., "Offset Perimeter and/or "Clean Perimeter" 310), "Operation" 312 (e.g., modification operations such as "Cut", "intersect", "join", "new bodies"), "Computer Option", and so on.

Figure 10:
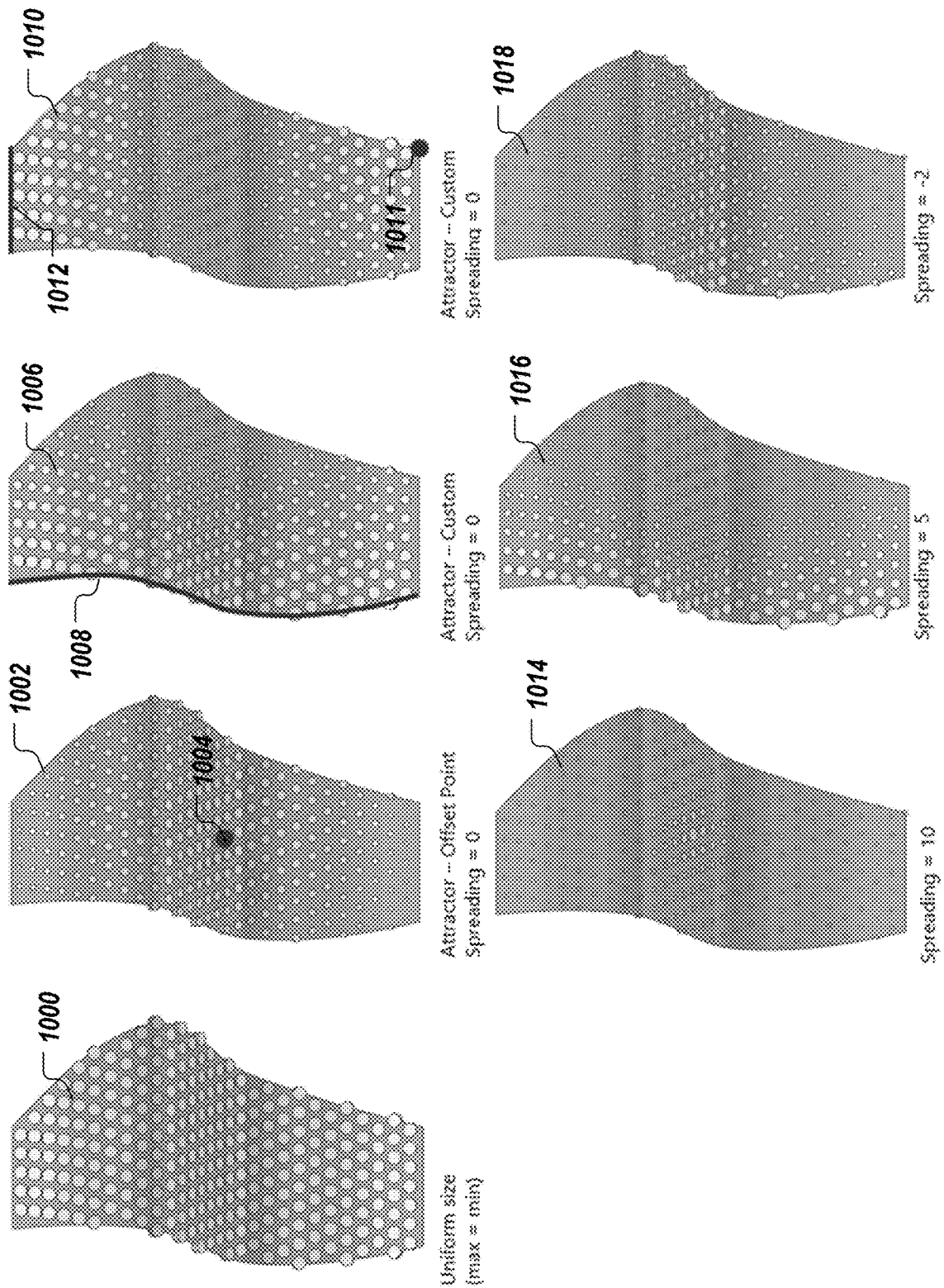
FIG. 10 shows graphical renderings of an example of generating 3D patterns under various size property settings.

FIG. 10 shows graphical renderings of an example of generating 3D patterns under various size property settings, e.g., through the "Size Properties" element in the UI element 300. In some implementations, the CAD program(s) 116 can generate a pattern, e.g., the pattern 1000, with uniform sizes when the maximum size equals the minimum size, e.g., when "Size Limit 1" 304 equals "Size Limit 2" 304. The "Size Attractor" element can define an attraction location from which the size distribution spreads out. The attractor can be based on a boundary representation (B-rep) body or surfaces, edges, sketches, construction entities, or a combination of these. For example, the attractor can be a point, a line, a curve, etc. In some implementations, the attractor can be a custom attractor defined by a user. In some implementations, a user can customize the spreading of the size by setting a value for "Spread" 306. For example, when the value of the "Spread" is 1.0, the distribution of the sizes is linear. When the value of the "Spread" is negative, the CAD program(s) 116 can invert the minimum and the maximum values when determining the distribution of the sizes.

For example, the CAD program(s) 116 can generate the pattern 1002 using a point attractor at the point 1004 with spreading equal to 0. The CAD program(s) 116 can generate the pattern 1006 using a customized edge attractor at the curve 1008 with spreading equal to 0. The CAD program(s) 116 can generate the pattern 1010 using a customized edge and point attractors at the line 1012 and the point 1011 with spreading equal to 0. The CAD program(s) 116 can generate the patterns 1014, 1016, and 1018 with the values of the spreading equal to 10, 5, and −2, respectively. As will be appreciated, many variations are possible for providing UI elements that enable the user to readily and rapidly define complex patterns by changing one or more portions of the function definition as well as the pattern type.

Referring back to FIG. 3, in some implementations, the CAD program(s) 116 can generate 3D patterns under various alignment settings, e.g., through "U Alignment" and "V Alignment" elements in the UI element 300. The alignment setting can be based on the UV-coordinate of the selected surface. The alignment setting is useful when the pattern needs to match on one or more shared edges of surfaces, e.g., under grid pattern type. The alignment setting may not affect the patterns under radial pattern type. For example, by selecting one of the three choices in the "U Alignment" element, a user may align the copies of the 3D feature along the left edge of the surface, along the center of the surface in the U coordinate, or along the right edge of the surface. By selecting one of the three choices in the "V Alignment" element, a user may align the copies of the 3D feature along the top edge of the surface, along the center of the surface in the V coordinate, or along the bottom edge of the surface.

In some implementations, the CAD program(s) 116 can generate 3D patterns under various distance settings, e.g., through "U distance" and "V distance" elements in the UI element 300. The distance settings can determine the distance(s) between the centers of nearby 3D features. The distance can have different meanings depending on the property of the selected surface, the 3D feature, or a combination of both. The distance settings can include the "U distance" element that defines the distance between 3D features in the U direction, and the "V distance" element that defines the distance between 3D features in the V direction. For example, the pattern 218 in FIG. 2 can have a uniform distance in both U and V directions, e.g., "U distance" equals 0.079 inches and "V distance" equals 0.079 inches.

In some implementations, the CAD program(s) 116 can accept user input that defines the distribution of the varied copies of the 3D feature over the surface. The distribution can orient each 3D feature to the contour of the surface, or the feature orientation can be straight down along a direction in the 3D space. For example, by default, the CAD program(s) 116 can generate copies of the 3D feature that conform to a curved surface. As another example, the CAD program(s) 116 can generate copies of the 3D feature that follow a custom direction, e.g., in x direction, y direction, z direction, or a rotated direction in the 3D space. The custom direction can be useful when the part being designed is to be manufactured in a particular molding direction.

In some implementations, the UI elements of the user interface 122 can include graphical user interface (GUI) elements that are associated with the pattern that is visualized in the display. For example, referring to FIG. 2, the GUI element 219 presented on the display device 120 with the visualization of the pattern being created by the user can control the placement of the pattern and/or the sizing of the 3D features across the surface. For example, the GUI element 219 can be used to change the height of the repeated pattern of cylinders, thus allowing the user to readily change the pattern of holes (created by the automatic removal of material wherever a cylinder intersects the 3D model) from blind holes to through holes.

In some implementations, the CAD program(s) 116 can receive input that includes change in the function, and can modify the aspect of the three-dimensional feature in accordance with the change in the function. In some implementations, the aspect of the three-dimensional feature can be sizing of the three-dimensional feature, and the input that changes the function can be user input to an element of the user interface that (i) changes a minimum size for the three-dimensional feature without changing a maximum size for the three-dimensional feature, or (ii) changes a maximum size for the three-dimensional feature without changing a minimum size for the three-dimensional feature.

In some implementations, the CAD program(s) 116 can receive input through the "Size Properties" element on the UI element 300, e.g., by receiving inputs for one or more of the "Size Limit 1" and "Size Limit 2" 304, that modifies the sizing of the 3D feature. For example, the "Size Limit 1" can be the maximum size of the 3D feature. The "Size Limit 2" can be the minimum size of the 3D feature. In some implementations, the sizing (e.g., the minimum size and/or the maximum size) of the feature can be modified and visualized in real-time by clicking and dragging one of the GUI elements.

Figure 4C:
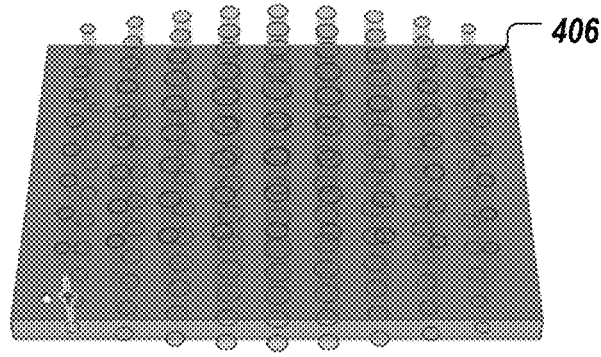
Figure 4D:
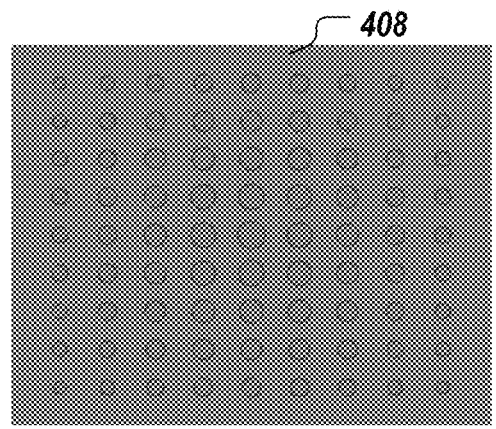

For example, referring to FIG. 4A, the initial pattern in the rendering 402 can have a maximum size (e.g., "Size Limit 1") of 2.00 inches and a minimum size (e.g., "Size Limit 2") of 2.00 inches, and thus all the copies of the cylinder object in the initial pattern can have the same size. FIG. 4C shows a rendering 406 of the copies of the features after a user modifies the sizing of the cylinder object, e.g., changing the minimum size of the cylinder object to 0.671 inches, while keeping the same maximum size. For example, the minimum size of the cylinder object can be modified and visualized in real-time by clicking and dragging one of the GUI elements, e.g., the GUI element 405. FIG. 4D shows a different rendering 408 of the same copies of the features as in the rendering 406 from another orientation. Changing the orientation of the view to look straight down, it is easier to see how the single feature (e.g., the cylinder object 212) that has been copied across the surface is large in the center and tapers off in size (e.g., getting smaller) the closer a copied feature is to the perimeter of the surface.

In some implementations, the CAD program(s) 116 can receive input that includes a change in the function, and can modify the aspect of the three-dimensional feature in accordance with the change in the function. In some implementations, the aspect of the three-dimensional feature can be offset from the regular position specified for the three-dimensional feature, and the input that changes the function can be user input to an element of the user interface that changes an offset between a center of the three-dimensional feature and the surface. The offset can be in a direction in the three dimensional space. In some implementations, the aspect of the 3D feature can be penetration or depth of the 3D feature into surface (e.g., the offset can be in z direction of the 3D space), and the offset can be a distance between the center of the 3D feature and the surface of the part being designed. Thus, the offset can determine how deep the varied copies of the 3D features go above or underneath the surface while conforming to the contour of the surface. Depth or penetration aspect of the 3D feature can be important to some manufacturing processes, such as molding, e.g., plastic molding. The CAD program(s) 116 can allow a user to easily configure the penetration of the 3D feature, e.g., through the user interface 122 of the CAD program(s) 116, improving the efficiency of the design process and making sure that the part being designed is manufacturable. In some implementations, the aspect of the 3D feature can be an offset in the U direction or V direction, or a direction in the 3D space.

Figure 9A:
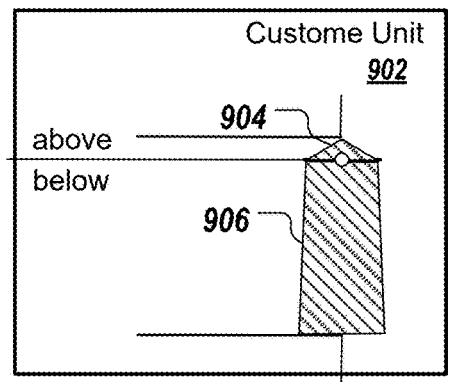
FIGS. 9A-9F are graphical renderings showing an example of modifying the penetration of a three-dimensional feature.
Figure 9B:
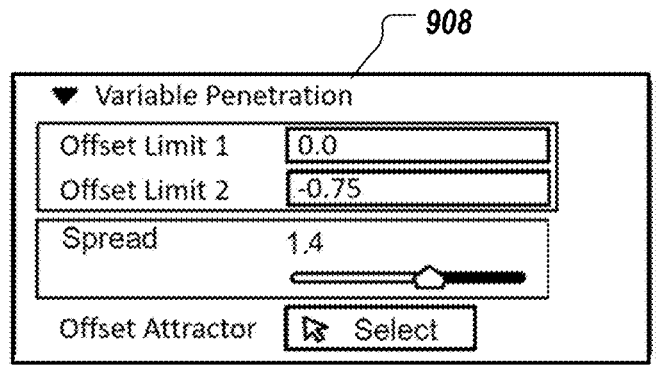
Figure 9C:
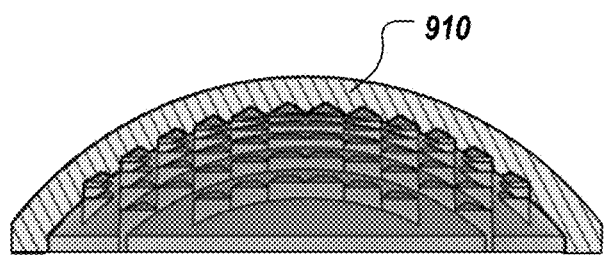
Figure 9D:
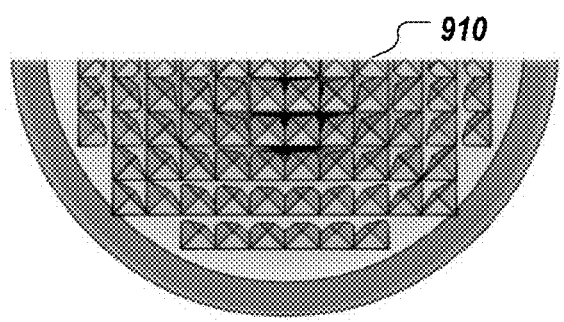
Figure 9E:
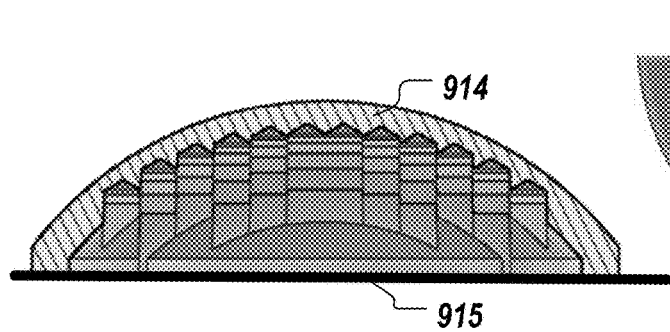
Figure 9F:
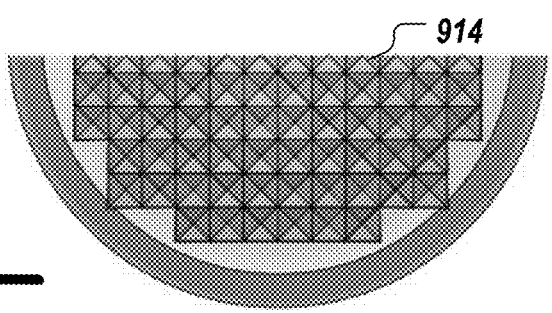

FIGS. 9A-9F are graphical renderings showing an example of modifying the penetration of a three-dimensional feature when designing a pattern for a light reflector. A user can select, e.g., through the UI element 300, the 3D feature to be used for patterning a part, e.g., the custom unit 902 in FIG. 9A. The custom unit 902 has a pyramid-shaped top part 904 and a bottom part 906, and a side view of the 3D feature is shown in FIG. 9A. The user can select a surface of a part, e.g., a sphere surface of a 3D body. The CAD program(s) 116 can add copies of the custom unit 902 to the surface of the solid model of the 3D body. In response to these selections, the CAD program(s) 116 can automatically generate an initial pattern 910. The side view of the initial pattern is in FIG. 9C, and the top view of the initial pattern is in FIG. 9D. By default, the offset of the varied copies of the 3D feature over the surface can be uniform. That is, the distance between the center of the 3D feature and the surface of the part can be the same value. Because the surface is a curved portion of a sphere shape, a portion of each pyramid-shaped top part 904 of the 3D feature can end up being below the surface of this sphere when the copied 3D feature is placed on the surface. This is not a desired pattern for a light reflector.

The CAD program(s) 116 can receive input that includes a change in the function, and can modify the penetration of the 3D feature 902 in accordance with the change in the function. The CAD program(s) 116 can include a user interface element 908 that modifies offset in accordance with a function, which can be used to configure the penetration offset over the surface. A user can provide, through the UI element 908, maximum offset between the center of the 3D feature and the surface (e.g., "Offset Limit 1" element in UI element 908), minimum offset between the center of the 3D feature and the surface (e.g., "Offset Limit 2" element in UI element 908), and the offset spreading (e.g., "Spread" element in UI element 908). A user can provide, through "Offset Attractor" of the UI element 908, an attractor for the distribution of the offset. For example, a user can customize the offset over the surface by setting "Offset Limit 1" to 0.0 inches, "Offset Limit 2" to −0.75 inches, "Spread" to 1.4, and selecting a construction plane 915 as an "Offset Attractor" for the distribution of the offset. After configuring the penetration, a side view of the pattern 914 is in FIG. 9E, and a top view of the pattern 914 is in FIG. 9F. Thus, the copies of the 3D feature 902 can have varied penetration into the surface such that the pyramid-shaped top part 904 of the 3D feature can be above the surface for all the varied copies of the 3D feature, while conforming to the contour of the surface.

In some implementations, the CAD program(s) 116 can receive input that changes the pattern type to a new pattern type. In response to receiving the input that changes the pattern type to the new pattern type, the CAD program(s) 116 can apply the function to the new pattern type to modify at least two of the varied copies of the three-dimensional feature. In some implementations, the CAD program(s) 116 can apply the function to the new pattern type to modify all of the varied copies of the three-dimensional feature.

Figure 4E:
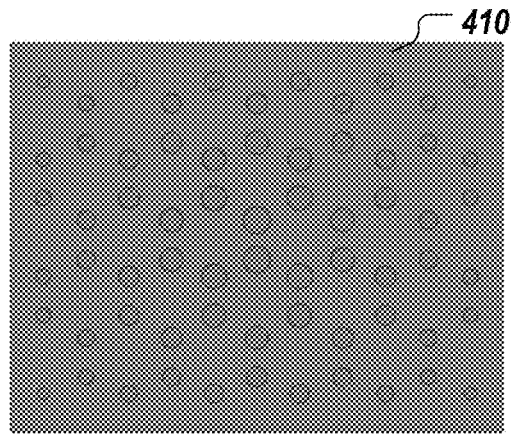
Figure 4F:
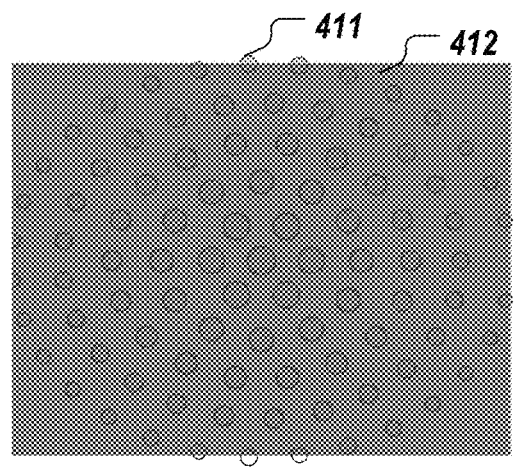
Figure 5A:
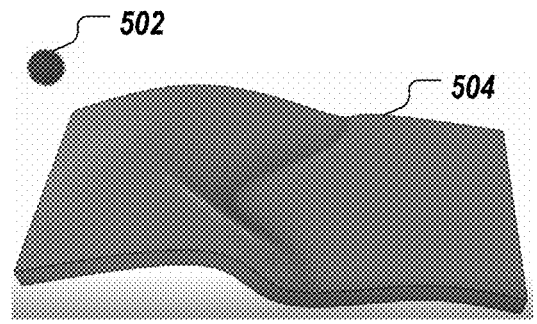
FIGS. 5A-5E are graphical renderings showing an example of using a sphere object to generate a pattern on a contoured surface of a part.
Figure 5B:
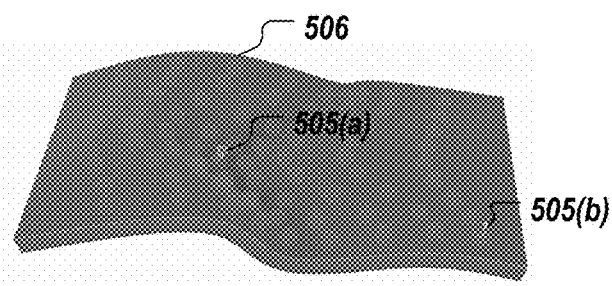
Figure 5C:
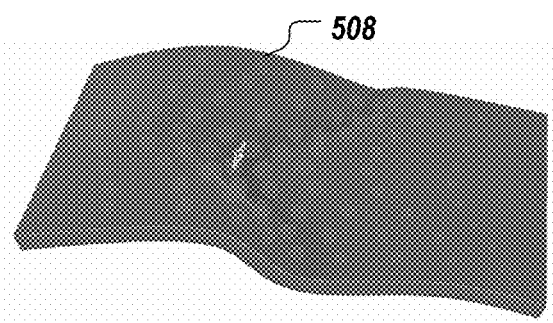
Figure 5D:
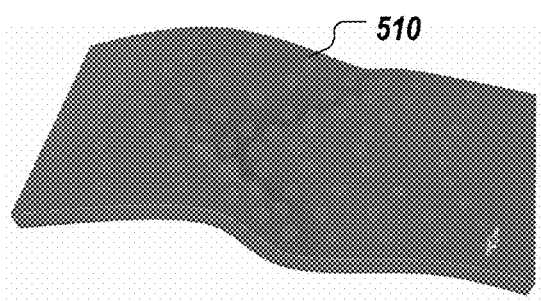
Figure 5E:
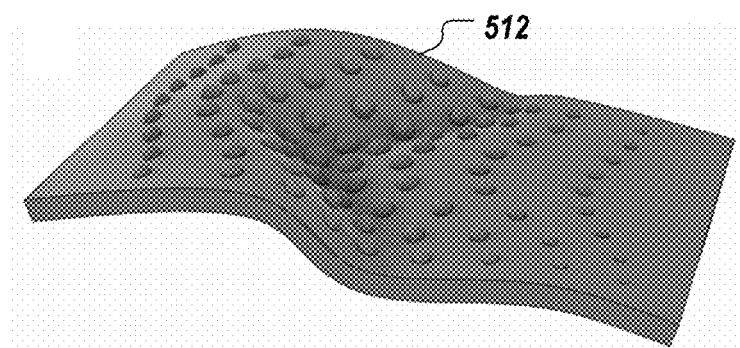

For example, after the adjustment of the size, the pattern itself can be changed if a user selects different pattern types in the properties dialog box 300 (e.g., the "Distribution Type" UI element 308), while maintaining the same variation in sizing across the surface. For example, a user can select a grid feature distribution type in place of the originally shown triangle feature distribution type in the initial rendering 402 in FIG. 4A. In response to the user selecting the grid feature distribution type, the CAD program(s) 116 can automatically generate the rendering 404 in FIG. 4B. FIG. 4E shows a rendering 410 of a hexagonal pattern type and FIG. 4F shows a rendering 412 of a radial pattern type. Other types of pattern distributions are also possible.

In some implementations, the CAD program(s) 116 can receive input that changes mapping of at least the portion of the range of the function to the three-dimensional space in accordance with the surface. In response to receiving input that changes the mapping of at least the portion of the range of the function, the CAD program(s) 116 can change the varied copies of the three-dimensional feature with respect to the surface. In some implementations, the input that changes the mapping of at least the portion of the range of the function can change an orientation of the mapping, and changing the varied copies of the three-dimensional feature with respect to the surface can include adjusting a rotation of a pattern of the varied copies of the three-dimensional feature with respect to the surface.

In some implementations, the input that changes the mapping of the at least the portion of the range of the function can change an offset applied to a perimeter of the surface, and changing the varied copies of the three-dimensional feature with respect to the surface can include repositioning the varied copies of the three-dimensional feature with respect to the surface.

For example, the user interface 122 can provide an interface element, e.g., "Offset Perimeter" UI element and/or "Clean Perimeter" UI element 310, that allows a user to control how close the perimeter of the surface the pattern of features is allowed to get. For example, the user can check the "Clean Perimeter" option in the properties dialog box 300. After clicking the "Clean Perimeter" option, the CAD program(s) 116 can remove some of the varied copies of the 3D feature (e.g., the copy 411) that are located near or outside of the perimeter of the 3D rectangular body.

In some implementations, the generating can be performed in accordance with parametric 3D modelling techniques, and the CAD program(s) 116 can receive input that includes change in the surface of the three-dimensional part being designed, and the CAD program(s) 116 can regenerate, in accordance with the parametric 3D modelling techniques, varied copies of the three-dimensional feature in accordance with the change in the surface. Thus, the 3D pattern can be automatically regenerated (e.g., recomputed using parametric 3D modeling techniques) if the surface is changed by a design tool or due to changes in manufacturing strategy and/or constraints. A change to the surface by the user can automatically result in appropriate changes to the 3D pattern that is associated with that surface.

FIGS. 8A-8E are graphical renderings showing an example of regenerating 3D patterns in response to surface changes. A user can select, e.g., through the UI element 300, the 3D feature to be used for patterning a part, e.g., the sphere object 802 in FIG. 8A. The user can select a surface of a part, e.g., an oval-shaped surface 804 of a 3D body. The CAD program(s) 116 can add copies of the sphere object 802 to the surface 804. In response to these selections, the CAD program(s) 116 can automatically generate an initial pattern. A user can use the CAD program(s) 116 to make changes to the initial pattern. For example, a user can click and drag the GUI element 805(a) in FIG. 8B to increase the size of the 3D feature in the middle region of the surface (e.g., from 3 mm to 5 mm), and can click and drag the GUI element 805(b) in FIG. 8B to decrease the size of the 3D feature at the perimeter of the surface (e.g., from 3 mm to 2 mm), resulting in the pattern 808 in FIG. 8C. As will be appreciated, one or more (or all) of the function aspects that can be changed in the text-based UI elements (e.g., in UI elements 300, 908) can have corresponding graphical UI elements. The CAD program(s) 116 can receive input that includes change in the surface 804. The surface 804 can be changed by a design tool or due to changes in manufacturing strategy and/or constraints. For example, the shape of the surface 804 can change from an oval 810 to a more rounded oval 811 in FIG. 8D. The CAD program(s) 116 can regenerate varied copies of the sphere object 802 in accordance with the change in the surface 804. The CAD program(s) 116 can automatically regenerate the pattern 812 in FIG. 8E according to the setting of the pattern, e.g., the sizing and spacing of the sphere objects. The number of sphere objects can be different in the pattern 812 from the number of sphere objects in the pattern 808 since the patterned feature adapts automatically to the new 3D geometry of the surface.

In some implementations, the CAD program(s) 116 can render the visualization of the varied copies of the three-dimensional feature to an animation document for a digital projector. For example, the CAD program(s) 116 can render at least a portion of the varied copies of the 3D feature to an animation document, e.g., DCP 165, for the digital projector, e.g., digital projector 174.

In some implementations, the three-dimensional part is being designed for manufacturing, and the surface can define a three-dimensional contour. In some implementations, the varied copies of the three-dimensional feature can follow the three-dimensional contour of the surface in a pre-defined manufacturing direction to be used to build the three-dimensional part. In some implementations, the varied copies of the three-dimensional feature can follow the three-dimensional contour of the surface in a local alignment of an additive manufacturing process to be used to build the three-dimensional part.

In some implementations, the CAD program(s) 116 can generate a toolpath specification for a computer-controlled manufacturing machine using the varied copies of the three-dimensional feature. The CAD program(s) 116 can manufacture the three-dimensional part with the varied copies of the three-dimensional feature mapped to the surface of the three-dimensional part using the toolpath specification generated for the computer-controlled manufacturing machine. The computer-controlled manufacturing machine can be an additive manufacturing machine or a subtractive manufacturing machine, and/or a machine using other manufacturing systems and techniques. For example, the CAD program(s) 116 can generate toolpath specifications for the computer-controlled manufacturing system(s) (e.g., AM machine(s) and/or SM machine(s) 170) using the 3D model of the 3D part that includes the varied copies of the three-dimensional feature mapped to the surface of the 3D part. The CAD program(s) 116 can manufacture at least a portion of the physical structure corresponding to the modeled 3D part with the computer-controlled manufacturing system(s) (e.g., AM machine(s) and/or SM machine(s) 170) using the toolpath specifications generated for the manufacturing machine (e.g., AM machine(s) and/or SM machine(s) 170).

Note that the 3D surface pattern generation in FIGS. 2-4 is but one example of many different types of surface patterns and/or 3D objects that can be designed using the systems and techniques described. Many different types of objects can be selected as a three-dimensional feature to be used to modify a three-dimensional part. The above example was for a simple 3D rectangular body with a flat surface, but the systems and techniques described work equally well with a 3D body having a complex, contoured surface.

FIGS. 5A-5E are graphical renderings showing an example of using a sphere object 502 to generate a pattern on a contoured surface of a part. A user can select, e.g., through the UI element 300, the 3D feature to be used for patterning a part, e.g., the sphere object 502 in FIG. 5A. The user can select a surface of a part, e.g., a contoured surface of a 3D body 504. The CAD program(s) 116 can add copies of the sphere object 502 to the surface of the solid model of the 3D body 504.

In response to these selections, the CAD program(s) 116 can automatically generate an initial pattern 506 and can render the initial pattern 506 to the display device 120 as a visualization of the copies of the 3D feature mapped to the surface of the part. Because the pattern is already mapped to the surface of the solid model, any changes made to the selected surface of the solid model using user interface controls of the CAD program(s) 116 can automatically result in corresponding changes being made to the visualized pattern. For example, a user can rotate the solid model around one or more axes to change the viewing perspective of the solid model. Moreover, the user can change the shape and/or dimensions of the 3D body 504, and the pattern 506 will automatically remap the 3D feature to the changed surface of the 3D body 504.

The display device 120 can present a UI element (e.g., the properties dialog box or GUI elements) on the user interface 122 of the CAD program(s) 116 that allows the user to modify the pattern shown on the display device 120. For example, the UI element can be the properties dialog box 300 in FIG. 3, or the click-and-drag GUI elements 505(a) and/or 505(b). For example, the GUI element 505(a) can be clicked and dragged to change the size of the feature in a middle region of the surface (e.g., without changing, or without substantially changing the size of the features at the perimeter of the surface). The GUI element 505(b) can be clicked and dragged to change the size of the feature at the perimeter of the surface (e.g., without changing, or without substantially changing the size of the features in a middle region of the surface). For example, from the pattern 506 in FIG. 5B, a user can click and drag the GUI element 505(a) to increase the size of the 3D feature in the middle region of the surface (e.g., from 0.25 inches to 0.277 inches), and can click and drag the GUI element 505(b) to decrease the size of the 3D feature at the perimeter of the surface (e.g., from 0.25 inches to 0.126 inches), resulting in the pattern 508 in FIG. 5C.

In some implementations, a user can change a falloff rate from bigger to smaller, or from smaller to bigger, for the 3D features across the surface using the "Spread" UI element 306 (e.g., a slider) in the properties dialog box 300. For example, from the pattern 508 in FIG. 5C, a user can drag the slider in the "Spread" UI element 306 to decrease the falloff rate (e.g., from 1.158 to 1.095), resulting in the pattern 510 in FIG. 5D. Other user interface elements that control a function used to vary the copies of the feature as they are applied to the pattern type across the surface are also possible.

In some implementations, the user can select an operation that modifies the part using the 3D feature. For example, a user can select "join" in the "Operation" UI element 312 to add the copies of the 3D sphere to the 3D body 504. Even though removal ("cut") and addition ("join") operations are shown in the examples in FIGS. 2 and 5A-5E, other operations are also possible, such as "intersection" and "new bodies" (e.g., the copied feature becomes new 3D bodies in the design). Other control options can also be provided, as shown in the properties dialog box 300.

In some implementations, when the user clicks the OK button in the properties dialog box 300, the CAD program(s) 116 can modify the solid model using the pattern of the copied features. For example, the CAD program(s) 116 can join the pattern of the copies of the sphere object 502 to the 3D body 504, resulting in the modeled part 512 in FIG. 5E. The pattern of the copies of the sphere can follow the complex curved contour of the surface of the 3D body 504. The overall process depicted in FIGS. 5A-5E can be achieved by the user in a manner of seconds, while adding this large variety of different features to such a complex surface of a part using a traditional tool would be difficult and would take a lot of time.

FIGS. 6A-6D are graphical renderings showing an example of using a cylinder object 602 to generate a pattern on a contoured top surface 604 of a part 606. A user can select, e.g., through the UI element 300, the 3D feature to be used for patterning a part, e.g., the cylinder object 602 in FIG. 6A. The user can select a surface of a part, e.g., the contoured top surface 604 of the part 606. The CAD program(s) 116 can modify the top surface 604 of the solid model of the part 606 using the copies of the cylinder object 602.

Figure 6A:
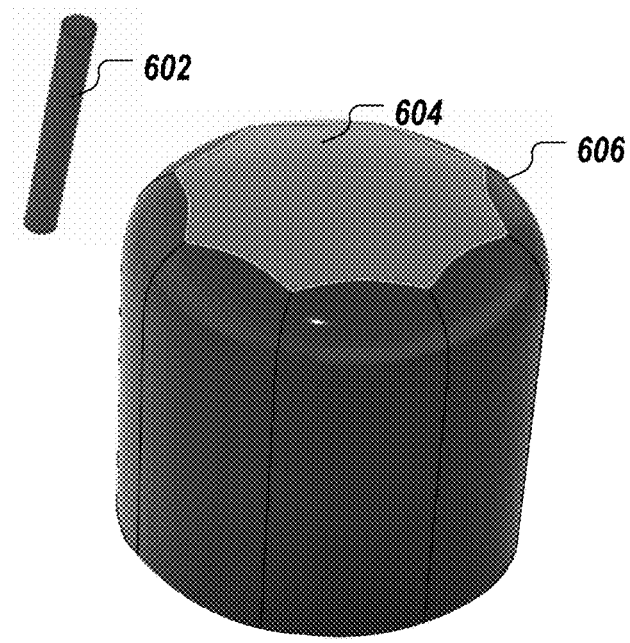
FIGS. 6A-6D are graphical renderings showing an example of using a cylinder object to generate a pattern on a contoured top surface of a part.
Figure 6B:
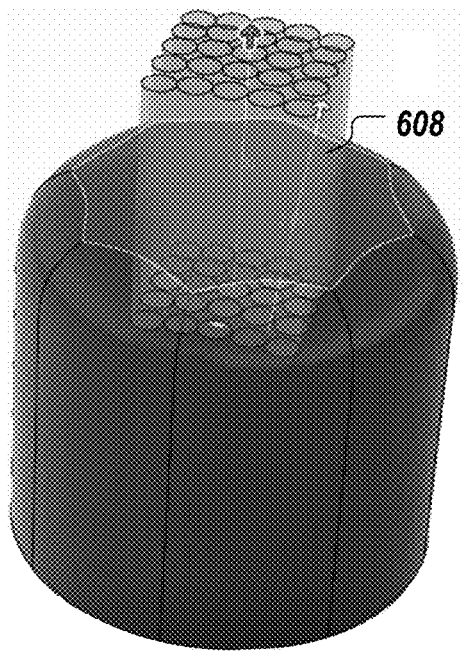
Figure 6C:
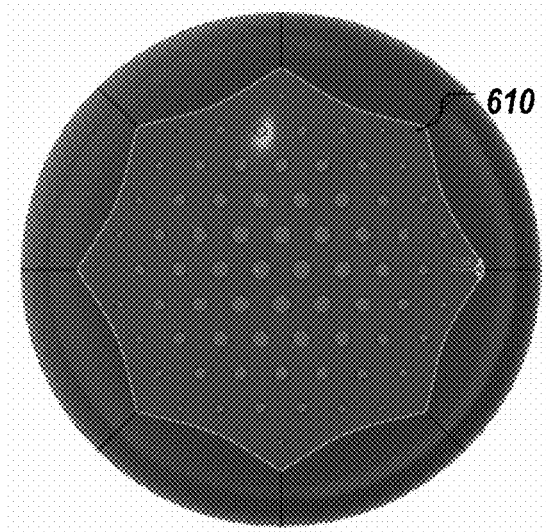
Figure 6D:
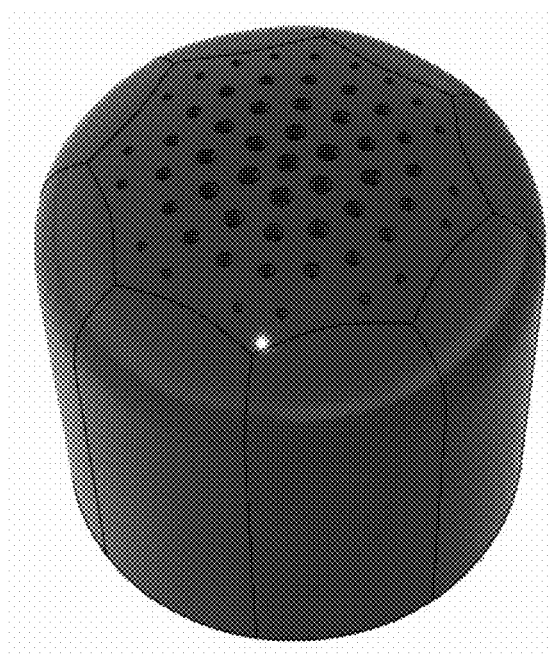

In response to these selections, the CAD program(s) 116 can automatically generate an initial pattern 608 and can render the initial pattern 608 to the display device 120 as a visualization of the copies of the 3D feature mapped to the surface of the part. The user can change the pattern type, adjust the sizing of the copied feature, and adjust the spread so the copied 3D feature gets even smaller as they approach the perimeter of the selected surface. For example, after changing the pattern type from grid to triangular and adjusting the size and spread, the CAD program(s) 116 can generate the surface pattern 610 as shown in FIG. 6C. The user can select the OK button in the properties dialog box 300, and the CAD program(s) 116 can remove material from the part 606 being designed in accordance with the designed pattern, e.g., removing the varied copies of the cylinder object 602 from the solid model of the part 606, FIG. 6D shows a visualization of the part 606 after the "cut" modification by the varied copies of the cylinder object 602.

The examples in FIGS. 2-6D are representative of the types of changes that can be made to many different types of three-dimensional models in a computer aided design program using the systems and techniques described. The systems and techniques described can facilitate rapid and dynamic patterning of parts being designed (e.g., to remove material) so as to allow sounds, lights, grip, thermal transfer, airflow, or other aspects for the part to function properly with a part to be manufactured. The systems and techniques described can facilitate rapid and dynamic patterning of parts being designed to add material to provide grip, aesthetic aspects, or other aspects for the part to be manufactured. The systems and techniques described can provide the user detailed, granular control of the pattern through a user interface that facilitates rapid creation of the pattern.

Figure 7:
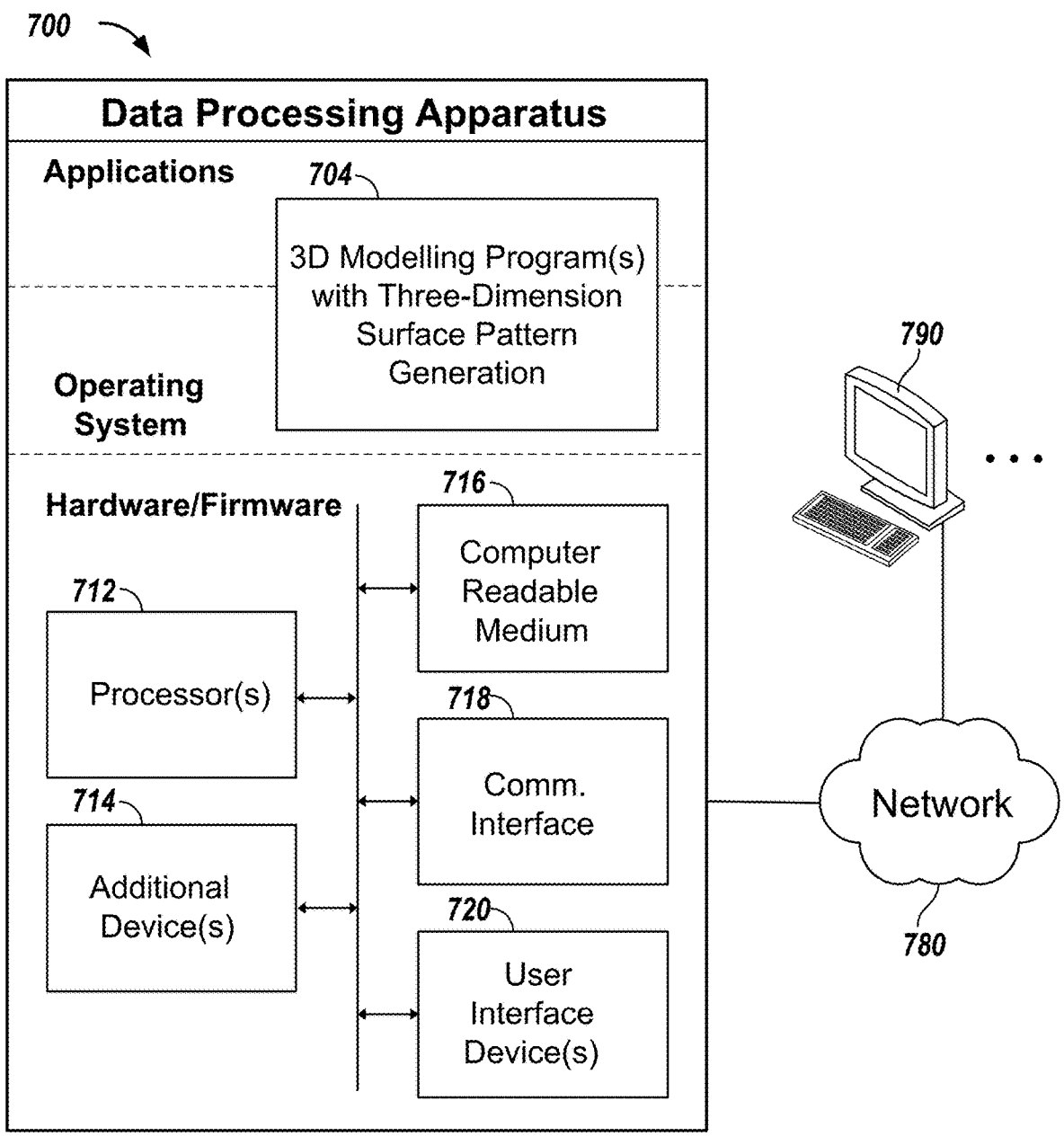
FIG. 7 is a schematic diagram of a data processing system including a data processing apparatus, which can be programmed as a client or as a server.
Figure 8A:
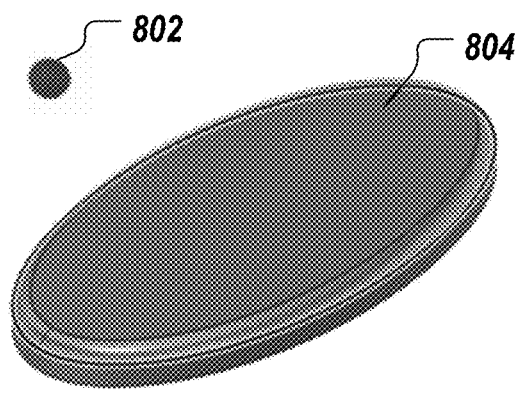
FIGS. 8A-8E are graphical renderings showing an example of regenerating 3D patterns in response to surface changes.
Figure 8B:
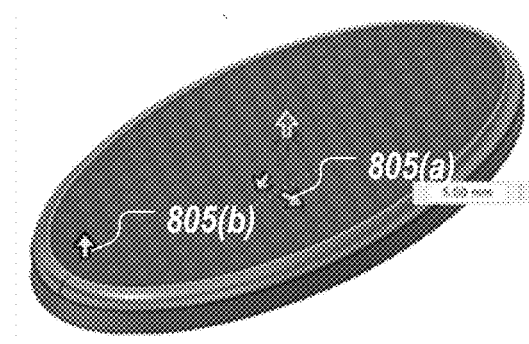
Figure 8C:
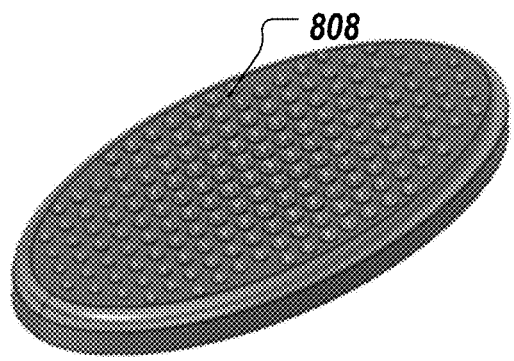
Figure 8D:
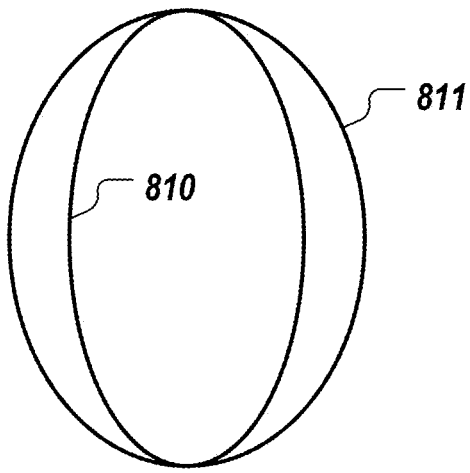
Figure 8E:
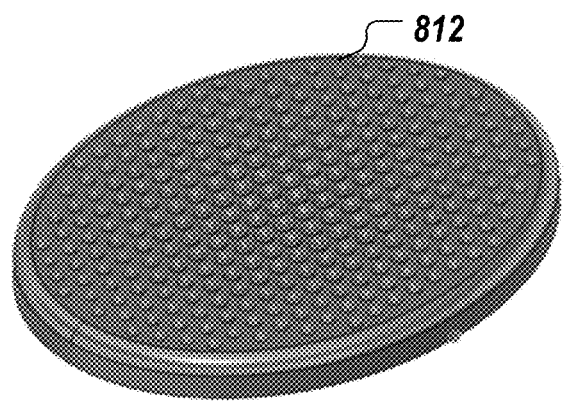

FIG. 7 is a schematic diagram of a data processing system including a data processing apparatus 700, which can be programmed as a client or as a server. The data processing apparatus 700 is connected with one or more computers 790 through a network 780. While only one computer is shown in FIG. 7 as the data processing apparatus 700, multiple computers can be used. The data processing apparatus 700 includes various software modules, which can be distributed between an application layer and an operating system. These can include executable and/or interpretable software programs or libraries, including tools and services of one or more 3D modeling programs 704 that implement the systems and techniques described herein. Thus, the 3D modeling program(s) 704 can be CAD program(s) that implements 3D modeling functions and generation of 3D surface patterns.

Further, the program(s) 704 can implement physical simulation operations (finite element analysis (FEA) or other), generative design operations (e.g., using level-set based method(s) for generative design), and/or manufacturing control operations (e.g., generating and/or applying toolpath specifications to effect manufacturing of designed objects), and/or movie animation production. The number of software modules used can vary from one implementation to another. Moreover, the software modules can be distributed on one or more data processing apparatus connected by one or more computer networks or other suitable communication networks.

The data processing apparatus 700 also includes hardware or firmware devices including one or more processors 712, one or more additional devices 714, a computer readable medium 716, a communication interface 718, and one or more user interface devices 720. Each processor 712 is capable of processing instructions for execution within the data processing apparatus 700. In some implementations, the processor 712 is a single or multi-threaded processor. Each processor 712 is capable of processing instructions stored on the computer readable medium 716 or on a storage device such as one of the additional devices 714. The data processing apparatus 700 uses the communication interface 718 to communicate with one or more computers 790, for example, over the network 780. Examples of user interface devices 720 include a display, a camera, a speaker, a microphone, a tactile feedback device, a keyboard, a mouse, and VR and/or AR equipment. The data processing apparatus 700 can store instructions that implement operations associated with the program(s) described above, for example, on the computer readable medium 716 or one or more additional devices 714, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as a hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:
   receiving, by a computer aided design program, input identifying (i) a pattern type, (ii) a three-dimensional feature to be used to modify a three-dimensional part, and (iii) a surface of the three-dimensional part being designed;
   generating, by the computer aided design program, varied copies of the three-dimensional feature in a three-dimensional space in which the three-dimensional part is defined, wherein an aspect of the three-dimensional feature varies for at least two of the varied copies of the three-dimensional feature in accordance with a function that is applied for the pattern type, and at least a portion of a range of the function is mapped to the three-dimensional space in accordance with the surface; and
   rendering, by the computer aided design program, a visualization of the varied copies of the three-dimensional feature, which are mapped to the surface, to a display device presenting a user interface of the computer aided design program.

2. The method of claim 1, comprising:
   receiving input that includes change in the function; and
   modifying the aspect of the three-dimensional feature in accordance with the change in the function.

3. The method of claim 2, wherein the aspect is sizing of the three-dimensional feature, the input that changes the function is user input to an element of the user interface that (i) changes a minimum size for the three-dimensional feature without changing a maximum size for the three-dimensional feature, or (ii) changes a maximum size for the three-dimensional feature without changing a minimum size for the three-dimensional feature.

4. The method of claim 2, wherein the aspect is offset of the three-dimensional feature, the input that changes the function is user input to an element of the user interface that changes an offset between a center of the three-dimensional feature and the surface.

5. The method of claim 1, comprising:
receiving input that changes the pattern type to a new pattern type; and
in response to receiving the input that changes the pattern type to the new pattern type, applying the function for the new pattern type to modify the at least two of the varied copies of the three-dimensional feature.

6. The method of claim 1, comprising:
receiving input that changes mapping of the at least the portion of the range of the function to the three-dimensional space in accordance with the surface; and
in response to receiving input that changes the mapping of the at least the portion of the range of the function, changing the varied copies of the three-dimensional feature with respect to the surface.

7. The method of claim 6, wherein the input that changes the mapping of the at least the portion of the range of the function changes a rotational orientation of the mapping, and the changing comprises adjusting a rotation of a pattern of the varied copies of the three-dimensional feature with respect to the surface.

8. The method of claim 6, wherein the input that changes the mapping of the at least the portion of the range of the function changes an offset applied to a perimeter of the surface, and the changing comprises repositioning the varied copies of the three-dimensional feature with respect to the surface.

9. The method of claim 1, wherein the three-dimensional part is being designed for manufacturing, the surface defines a three-dimensional contour, and the varied copies of the three-dimensional feature follow the three-dimensional contour of the surface in a pre-defined manufacturing direction to be used to build the three-dimensional part.

10. The method of claim 1, wherein the three-dimensional part is being designed for manufacturing, the surface defines a three-dimensional contour, and the varied copies of the three-dimensional feature follow the three-dimensional contour of the surface in a local alignment of an additive manufacturing process to be used to build the three-dimensional part.

11. The method of claim 1, wherein the rendering comprises rendering the visualization of the varied copies of the three-dimensional feature, which are mapped to the surface of the three-dimensional part, to an animation document for a digital projector.

12. The method of claim 1, comprising:
generating a toolpath specification for a computer-controlled manufacturing machine using the varied copies of the three-dimensional feature; and
manufacturing the three-dimensional part with the varied copies of the three-dimensional feature mapped to the surface of the three-dimensional part using the toolpath specification generated for the computer-controlled manufacturing machine.

13. The method of claim 1, wherein the generating is performed in accordance with parametric 3D modelling techniques, and the method comprises:
receiving input that includes change in the surface of the three-dimensional part being designed; and regenerating, in accordance with the parametric 3D modelling techniques, varied copies of the three-dimensional feature in accordance with the change in the surface.

14. A system comprising:
a non-transitory storage medium having instructions of a computer aided design program stored thereon; and
one or more data processing apparatus configured to run the instructions of the computer aided design program to perform operations specified by the instructions of the computer aided design program;
wherein the operations comprise:
receiving input identifying (i) a pattern type, (ii) a three-dimensional feature to be used to modify a three-dimensional part, and (iii) a surface of the three-dimensional part being designed;
generating varied copies of the three-dimensional feature in a three-dimensional space in which the three-dimensional part is defined, wherein an aspect of the three-dimensional feature varies for at least two of the varied copies of the three-dimensional feature in accordance with a function that is applied for the pattern type, and at least a portion of a range of the function is mapped to the three-dimensional space in accordance with the surface; and
rendering a visualization of the varied copies of the three-dimensional feature, which are mapped to the surface, to a display device presenting a user interface of the computer aided design program.

15. The system of claim 14, the operations comprise:
receiving input that includes change in the function; and
modifying the aspect of the three-dimensional feature in accordance with the change in the function.

16. The system of claim 15, wherein the aspect is sizing of the three-dimensional feature, the input that changes the function is user input to an element of the user interface that (i) changes a minimum size for the three-dimensional feature without changing a maximum size for the three-dimensional feature, or (ii) changes a maximum size for the three-dimensional feature without changing a minimum size for the three-dimensional feature.

17. The system of claim 15, wherein the aspect is offset of the three-dimensional feature, the input that changes the function is user input to an element of the user interface that changes an offset between a center of the three-dimensional feature and the surface.

18. The system of claim 14, the operations comprise:
receiving input that changes the pattern type to a new pattern type; and
in response to receiving the input that changes the pattern type to the new pattern type, applying the function for the new pattern type to modify the at least two of the varied copies of the three-dimensional feature.

19. The system of claim 14, the operations comprise:
receiving input that changes mapping of the at least the portion of the range of the function to the three-dimensional space in accordance with the surface; and
in response to receiving input that changes the mapping of the at least the portion of the range of the function, changing the varied copies of the three-dimensional feature with respect to the surface.

20. A non-transitory computer-readable medium encoding instructions operable to cause data processing apparatus to perform operations comprising:
receiving input identifying (i) a pattern type, (ii) a three-dimensional feature to be used to modify a three-dimensional part, and (iii) a surface of the three-dimensional part being designed;

generating varied copies of the three-dimensional feature in a three-dimensional space in which the three-dimensional part is defined, wherein an aspect of the three-dimensional feature varies for at least two of the varied copies of the three-dimensional feature in accordance with a function that is applied for the pattern type, and at least a portion of a range of the function is mapped to the three-dimensional space in accordance with the surface; and rendering a visualization of the varied copies of the three-dimensional feature, which are mapped to the surface, to a display device presenting a user interface of a computer aided design program.

21. The non-transitory computer-readable medium of claim 20, wherein the operations comprise:

receiving input that includes change in the function; and modifying the aspect of the three-dimensional feature in accordance with the change in the function.

22. The non-transitory computer-readable medium of claim 21, wherein the aspect is sizing of the three-dimensional feature, the input that changes the function is user input to an element of the user interface that (i) changes a minimum size for the three-dimensional feature without changing a maximum size for the three-dimensional feature, or (ii) changes a maximum size for the three-dimensional feature without changing a minimum size for the three-dimensional feature.

23. The non-transitory computer-readable medium of claim 21, wherein the aspect is offset of the three-dimensional feature, the input that changes the function is user input to an element of the user interface that changes an offset between a center of the three-dimensional feature and the surface.

24. The non-transitory computer-readable medium of claim 20, wherein the operations comprise:

receiving input that changes the pattern type to a new pattern type; and in response to receiving the input that changes the pattern type to the new pattern type, applying the function for the new pattern type to modify the at least two of the varied copies of the three-dimensional feature.

25. The non-transitory computer-readable medium of claim 20, wherein the operations comprise:

receiving input that changes mapping of the at least the portion of the range of the function to the three-dimensional space in accordance with the surface; and in response to receiving input that changes the mapping of the at least the portion of the range of the function, changing the varied copies of the three-dimensional feature with respect to the surface.

26. The non-transitory computer-readable medium of claim 25, wherein the input that changes the mapping of the at least the portion of the range of the function changes a rotational orientation of the mapping, and the changing comprises adjusting a rotation of a pattern of the varied copies of the three-dimensional feature with respect to the surface.

27. The non-transitory computer-readable medium of claim 25, wherein the input that changes the mapping of the at least the portion of the range of the function changes an offset applied to a perimeter of the surface, and the changing comprises repositioning the varied copies of the three-dimensional feature with respect to the surface.

28. The non-transitory computer-readable medium of claim 20, wherein the three-dimensional part is being designed for manufacturing, the surface defines a three-dimensional contour, and the varied copies of the three-dimensional feature follow the three-dimensional contour of the surface in a pre-defined manufacturing direction to be used to build the three-dimensional part.

29. The non-transitory computer-readable medium of claim 20, wherein the three-dimensional part is being designed for manufacturing, the surface defines a three-dimensional contour, and the varied copies of the three-dimensional feature follow the three-dimensional contour of the surface in a local alignment of an additive manufacturing process to be used to build the three-dimensional part.

30. The non-transitory computer-readable medium of claim 20, wherein the rendering comprises rendering the visualization of the varied copies of the three-dimensional feature, which are mapped to the surface of the three-dimensional part, to an animation document for a digital projector.

31. The non-transitory computer-readable medium of claim 20, wherein the operations comprise:

generating a toolpath specification for a computer-controlled manufacturing machine using the varied copies of the three-dimensional feature; and manufacturing the three-dimensional part with the varied copies of the three-dimensional feature mapped to the surface of the three-dimensional part using the toolpath specification generated for the computer-controlled manufacturing machine.

32. The non-transitory computer-readable medium of claim 20, wherein the generating is performed in accordance with parametric 3D modelling techniques, and the operations comprise:

receiving input that includes change in the surface of the three-dimensional part being designed; and regenerating, in accordance with the parametric 3D modelling techniques, varied copies of the three-dimensional feature in accordance with the change in the surface.

33. The system of claim 19, wherein the input that changes the mapping of the at least the portion of the range of the function changes a rotational orientation of the mapping, and the changing comprises adjusting a rotation of a pattern of the varied copies of the three-dimensional feature with respect to the surface.

34. The system of claim 19, wherein the input that changes the mapping of the at least the portion of the range of the function changes an offset applied to a perimeter of the surface, and the changing comprises repositioning the varied copies of the three-dimensional feature with respect to the surface.

35. The system of claim 14, wherein the three-dimensional part is being designed for manufacturing, the surface defines a three-dimensional contour, and the varied copies of the three-dimensional feature follow the three-dimensional contour of the surface in a pre-defined manufacturing direction to be used to build the three-dimensional part.

36. The system of claim 14, wherein the three-dimensional part is being designed for manufacturing, the surface defines a three-dimensional contour, and the varied copies of the three-dimensional feature follow the three-dimensional contour of the surface in a local alignment of an additive manufacturing process to be used to build the three-dimensional part.

37. The system of claim 14, wherein the rendering comprises rendering the visualization of the varied copies of the three-dimensional feature, which are mapped to the surface of the three-dimensional part, to an animation document for a digital projector.

38. The system of claim 14, wherein the operations comprise:
   generating a toolpath specification for a computer-controlled manufacturing machine using the varied copies of the three-dimensional feature; and
   manufacturing the three-dimensional part with the varied copies of the three-dimensional feature mapped to the surface of the three-dimensional part using the toolpath specification generated for the computer-controlled manufacturing machine.

39. The system of claim 14, wherein the generating is performed in accordance with parametric 3D modelling techniques, and the operations comprise:
   receiving input that includes change in the surface of the three-dimensional part being designed; and
   regenerating, in accordance with the parametric 3D modelling techniques, varied copies of the three-dimensional feature in accordance with the change in the surface.

* * * * *